(12) United States Patent
Jacobs

(10) Patent No.: US 8,037,862 B1
(45) Date of Patent: Oct. 18, 2011

(54) SIMPLIFIED MULTIFUNCTION COMPONENT ROTARY ENGINE

(76) Inventor: Richard L. Jacobs, Newbury Park, CA (US)

( * ) Notice: Subject to any disclaimer, the term of this patent is extended or adjusted under 35 U.S.C. 154(b) by 799 days.

(21) Appl. No.: 12/129,676

(22) Filed: May 29, 2008

Related U.S. Application Data

(60) Provisional application No. 60/941,680, filed on Jun. 3, 2007.

(51) Int. Cl.
*F02B 53/00* (2006.01)
(52) U.S. Cl. ........ 123/242; 123/200; 123/218; 418/61.3
(58) Field of Classification Search .................. 123/200, 123/218, 242; 418/61.3
See application file for complete search history.

(56) References Cited

U.S. PATENT DOCUMENTS

| | | | |
|---|---|---|---|
| 1,277,018 A | | 8/1918 | Wofington |
| 2,162,771 A | | 6/1939 | Winans |
| 3,285,189 A | | 11/1966 | Cornelis |
| 3,301,228 A | | 1/1967 | Winans |
| 3,922,120 A | * | 11/1975 | McCullough et al. ........ 123/242 |
| 3,996,901 A | | 12/1976 | Gale et al. |
| 4,008,982 A | | 2/1977 | Traut |
| 4,101,248 A | | 7/1978 | Traut |
| 4,187,062 A | | 2/1980 | Traut |
| 4,188,176 A | | 2/1980 | Traut |
| 5,127,377 A | | 7/1992 | Yang |
| 5,810,574 A | | 9/1998 | Marx et al. |

OTHER PUBLICATIONS

Office Action dated Mar. 20, 2009 of U.S. Appl. No. 11/354,660, filed Feb. 15, 2006.
Office Action dated Mar. 31, 2009 of U.S. Appl. No. 11/690,844, filed Mar. 25, 2007.
Office Action dated Apr. 1, 2008 of U.S. Appl. No. 11/021,369, filed Dec. 22, 2004.

* cited by examiner

*Primary Examiner* — Mary A Davis
(74) *Attorney, Agent, or Firm* — Koppel, Patrick, Heybl & Philpott

(57) ABSTRACT

An internal combustion rotary engine has a chamber defined by a chamber wall and a rotor valve body in three locus-sealing contact with the chamber wall to define a series of three subchambers including a first subchamber for sequential compression, transfer, and combustion of a fuel mixture from a chamber fuel mixture intake and for exhausting combustion products through a chamber exhaust outlet. The rotor body defines a first bodily internal path for fuel mixture travel from the intake to the first subchamber for compression and combustion to combustion products, and a second bodily internal exhaust travel path between the combustion products in the first subchamber and the chamber exhaust outlet for exhausting of the combustion products. The chamber and rotor cooperate to transfer compressed fuel mixture past the rotor within the first subchamber. The rotor further defines a sealing and sliding valve structure with the chamber wall for controlling intake into and exhaust from the first subchamber. Two additional chamber carry out the same functions in time-delayed sequence.

30 Claims, 18 Drawing Sheets

US 8,037,862 B1

SIMPLIFIED MULTIFUNCTION COMPONENT ROTARY ENGINE

REFERENCE TO RELATED APPLICATION

This application claims the benefit of U.S. Provisional Application Ser. No. 60/941,680, filed Jun. 3, 2007.

FIELD OF THE INVENTION

This invention has to do with rotary power devices and more particularly with improvements in the construction and operation of internal combustion rotary engines to have improved power to weight ratios and minimum moving components through having multiple functionality in these components including crank plates (rotating plates having an axially offset crank pin) and cooperating rotors. A single rotor is used with planar intake and exhaust faces and a generally curvilinear outwardly convex periphery to rotate within a chamber having cooperating planar intake and exhaust faces, primarily defined by the crank plates, and a generally triangular perimeter defining inwardly convex curvilinear sides; the opposed rotor and chamber curvatures are selected such that there is continuous three locus sealing contact between the rotor periphery and the chamber perimeter as more fully set out below while the rotor dynamically defines three subchambers within the chamber of progressively varying volume and simultaneous but time-offset successive operation through cycles of fuel compression, transfer, combustion and exhaust separately and simultaneously. Fuel intake, spark ignition thereof and exhaust of combustion products are accomplished through interior passages through the rotor while compressed fuel transfer occurs exteriorly of the rotor. The rotor interior passages selectively communicate between fuel supply and subchambers for fuel compression, between compressed fuel and a spark source, and between combustion products and an exhaust outlet, all simultaneously while the rotor undergoes rotation under fuel combustion force and while connected centrally via a crank pin to the crank plates journaled by the chamber to drive an output shaft about the axis of the crank plates while the rotor rotates about its own center.

Importantly, by rounding off the vertices of the essentially equilateral triangle of the chamber and applying just the right inward curvature to the triangular chamber sides and a selected arc to the rotor faces to maintain three locus sealing contact between the rotor and chamber, the invention is able to use a crank plate rotating about its own axis and driving an output shaft about the same axis while the rotor rotates about its own center and follows an opposite and different pattern rotation inside of the chamber. Details of the construction of these rotors and chambers are set out in my copending application Ser. No. 11/690,844, the disclosure of which is hereby incorporated herein as though fully set forth. Complicated gearing of devices like the Wankel engine is avoided, replaced by cooperating curvatures on the chamber sides and rotor faces that provide smooth rotation without locking up at disadvantaged angles. Complicated porting and valving of the prior is replaced by a multifunction rotor providing fuel, exhaust and spark paths through the rotor body and sliding sealing at the ports in the course of the rotor counterrotating against the crank plates which define the intake and exhaust ports.

RELATED ART

The rotary engine, motor and pump arts can be considered related to this invention.

SUMMARY OF THE INVENTION

It is an object of the invention to provide an improved energy conversion device. It is a further object to provide an internal combustion rotary engine having a minimum of moving parts, modular design, multifunctionality in its components, and a high horsepower to weight ratio. Another object is to provide in an internal combustion rotary engine a generally triangular chamber and elongated rotor cooperatively shaped such that there is continuous three locus sealing contact between these components to define three subchambers that perform identical functions simultaneously but successively and offset in time. Another object is to provide porting and passages for fuel mixture and exhaust in a rotary engine that uses the rotor as both a fuel and exhaust passageway locus and a sliding valve opening and closing mechanism while sealing against the chamber. A still further object is to provide a crank plate-operated output shaft in an internal combustion engine that rotates on the axis of the crank plate while the crank plate is connected to the center hub of the rotor with the rotor motion controlled by the cooperating curvatures of the chamber walls and rotor surfaces. A further object is to provide a rotor and chamber assembly having the mentioned cooperating shapes and method therefor.

These and other objects of the invention to become apparent hereinafter are realized in an internal combustion rotary engine having a chamber defined by a chamber wall and a rotor valve body in three locus-sealing contact with the chamber wall to define a series of three subchambers including a first subchamber for sequential compression, transfer, and combustion of a fuel mixture from a chamber fuel mixture intake and for exhausting combustion products through a chamber exhaust outlet, the rotor body defining a first bodily internal path for fuel mixture travel from the intake to the first subchamber for the compression, transfer and combustion to combustion products, and a second bodily internal exhaust travel path between the combustion products in the first subchamber and the chamber exhaust outlet for exhausting of the combustion products, said chamber and rotor cooperating to transfer compressed fuel mixture past said rotor within said first subchamber, the rotor further defining a sealing and sliding valve structure with the chamber wall for controlling intake into and exhaust from the first subchamber.

In this and like embodiments, typically, the chamber has a spark generation structure, the rotor defining a third bodily internal path between the spark generation structure and the first subchamber for effecting fuel mixture combustion, the rotor is centrally connected to intake side and exhaust side crank plates journaled in the chamber walls to drive on the axes of the crank plates an output shaft coupled to the crank plates, the rotor advances to sweep the first subchamber, first subchamber defines a compressed fuel mixture lock beyond the sweep of the rotor for transferring the fuel mixture past the rotor after compression by the advance of the rotor and before combustion in the wake of the rotor, the fuel mixture intake extends through the intake side crank plate to an intake port into the chamber, and the rotor first bodily internal path includes an arcuately extended intake recess selectively registerable with the fuel mixture intake port in fuel intake valve defining relation, the chamber exhaust outlet extends from an exhaust port from the chamber through the exhaust side crank plate, and the rotor second bodily internal path includes an arcuately extended exhaust recess selectively registerable with the exhaust port in exhaust valve defining relation, and/or the series of subchambers further includes second and third subchambers having the same structure and cycle of functions as the first subchamber, each the subchamber including a different chamber vertex and being arranged to have their cycles offset in time.

In a further embodiment the invention provides an internal combustion rotary engine comprising an assembly of a chamber and a rotor, the rotor having a body with a central hub, the rotor body defining within the chamber three subchambers each at least partly defined by opposed intake and exhaust crank plates connected to the rotor body hub and each providing successively in time offset relation sequential compression, transfer, combustion and exhaust functions, a spark generation structure, a fuel mixture supply, and an output shaft coupled to a the crank plate, the rotor body having rotor intake structure selectively and in sequence communicating through the rotor body the fuel mixture supply to each the subchamber for compression, transferring past the rotor body and combustion, and communicating through the rotor body the spark generation structure with compressed fuel mixture for combustion thereof, the rotor having rotor exhaust structure selectively communicating through the rotor body subchamber combustion by products for exhaust to a region beyond the chamber, all in timed relation to drive the output shaft with the rotor body via the rotor-coupled and output shaft-connected crank plate.

In this and like embodiments, typically, the chamber and rotor body are relatively shaped for rotor rotation in continuous and dynamic three locus sealing contact of the chamber and the rotor body to define the subchambers, the subchambers being simultaneously responsive to rotor rotation to have progressively varying expanding and contracting volumes for respective compression, transfer, combustion and exhaust functions, the chamber has intake and exhaust side sidewalls, a depth defined by a generally triangular, curvilinear perimeter wall spacing the chamber intake and exhaust sidewalls and defining three equally spaced, relatively angularly disposed, symmetrical, inwardly convex chamber surfaces joined by three vertices, the rotor body has oppositely facing rotor sidewalls, a curvilinear outwardly peripheral wall providing two oppositely facing outwardly convex major rotor surfaces and two apexes spaced by the rotor sidewalls and joining the major rotor surfaces cooperatively shaped to have continuous and dynamic three locus sealing contact of the chamber wall and the rotor body, the chamber includes a chamber intake side wall for fuel mixture intake to the chamber from the supply, the intake sidewall journaling the intake side crank plate, the intake side crank plate being connected to the rotor central hub by a crank pin, a chamber exhaust sidewall journaling the exhaust side crank plate, the exhaust side crank plate being connected to the rotor body central hub by a crank pin, the intake side crank plate defines a fuel mixture path from the fuel mixture supply to the rotor body intake structure, the exhaust side crank plate defines an exhaust port and exhaust outlet from the subchambers to a region beyond the chamber, the spark generation structure includes a spark plug carried by the chamber, and a spark communicating structure through the rotor body selectively communicating the spark plug with compressed fuel mixture in a subchamber responsive to rotor body rotation within the chamber, the chamber has an exhaust side sidewall journaling the exhaust crank plate, an intake side sidewall journaling the intake side crank plate, the crank plates being crank pin-coupled to the rotor hub, the intake side crank plate having a fuel intake port in communication with the fuel supply and open to the chamber, the rotor body sidewall selectively sealably engaging the intake side crank at the fuel intake port in timed relation with rotor rotation to limit fuel intake to the chamber, the rotor body has an exhaust side rotor body sidewall and an intake side rotor body sidewall, the chamber has an exhaust side sidewall opposing the exhaust side rotor body sidewall, the exhaust side crank plate is journaled by the chamber exhaust side sidewall, the exhaust side crank being crank pin-coupled to the rotor body central hub, and including also the chamber having an intake side sidewall opposing the intake side rotor sidewall, an intake side crank plate opposite the exhaust side crank plate and journaled by the chamber intake sidewall, the exhaust side crank plate having an exhaust port in communication with a region beyond the chamber and open to the chamber, the rotor body exhaust sidewall valve-controlling exhaust from the subchamber to the region in timed relation with rotor body rotation to limit exhaust from the subchamber to products of fuel mixture combustion, the intake side crank plate has a fuel intake port in communication with the fuel mixture supply and open to the chamber, the intake side rotor body sidewall valve-controlling fuel mixture intake from the fuel intake port in timed relation with rotor body rotation to limit fuel mixture intake to a the subchamber, the chamber journals an intake side crank plate having a fuel intake port in communication with the fuel supply and open to the chamber, the rotor body has an intake side rotor sidewall sealably engaging the intake side crank plate at the intake port, and in which the rotor body intake structure comprises an intake recess in the crank plate-engaged rotor body sidewall larger than and arranged to register with the fuel mixture intake port and a rotor body intake passage from the intake recess through the rotor body to a subchamber for fuel mixture compression in timed relation with rotor body rotation to limit fuel intake to the subchamber for compression, the intake recess is arcuately extended over for extended registration with the fuel mixture intake port during rotor body rotation, the exhaust side crank plate is journaled by the chamber, the exhaust crank plate has an exhaust port open to the chamber, the rotor body has an exhaust side rotor sidewall sealably engaging the exhaust side crank plate at the exhaust port, and in which the rotor body exhaust structure comprises an exhaust recess in the crank-engaged rotor body sidewall larger than and arranged to register with the exhaust port and the rotor body exhaust passage from the exhaust recess through the rotor body from a subchamber for exhaust in timed relation with rotor body rotation to have combustion products exhaust from a subchamber limited to combustion products in the subchamber, and/or the exhaust recess is arcuately extended for extended registration with the exhaust port during rotor body rotation.

In a further embodiment, the invention provides an internal combustion rotary engine comprising an assembly of a chamber and rotor, the rotor having a body with a central hub, the chamber and rotor body being relatively shaped for rotor rotation in continuous and dynamic three locus sealing contact of the chamber and the rotor body to define three subchambers that are simultaneously responsive to rotor rotation to have progressively varying expanding and contracting volumes for respective compression, transfer, combustion and exhaust functions, each subchamber being at least partly defined by opposed intake and exhaust crank plates crank-pin connected to the rotor body hub, a spark generation structure, a fuel mixture supply, and an output shaft coupled to the crank, the rotor body having rotor intake structure selectively and in sequence communicating through the rotor body the fuel mixture supply to the subchambers for compression, transferring past the rotor body, and combustion, and communicating through the rotor body the subchambers with the spark generation structure for fuel mixture combustion, the rotor having rotor exhaust structure selectively communicating through the rotor body the subchambers for exhaust to a region beyond the chamber, all in timed relation to drive the output shaft with the rotor body via the rotor-coupled and output shaft-connected crank plates.

In this and like embodiments, typically, the chamber has intake and exhaust side sidewalls, a depth defined by a generally triangular, curvilinear perimeter wall spacing the chamber intake and exhaust sidewalls and defining three equally spaced, relatively angularly disposed, symmetrical, inwardly convex chamber surfaces joined by three vertices, the rotor body has oppositely facing rotor sidewalls, a curvilinear outwardly peripheral wall providing two oppositely facing outwardly convex major rotor surfaces and two apexes spaced by the rotor sidewalls and joining the major rotor surfaces cooperatively shaped to have continuous and dynamic three locus sealing contact of the chamber wall and the rotor body, the exhaust side crank plate is journaled in the chamber exhaust sidewall, and including an exhaust port for combustion products through the exhaust side crank plate from the rotor exhaust structure, the spark generation structure includes a spark plug carried by a the chamber sidewall, and a spark communicating structure through the rotor body selectively communicating the spark plug with compressed fuel mixture in the subchambers responsive to rotor body rotation within the chamber, the intake side crank plate has a fuel intake port in communication with the fuel supply and open to the chamber, the rotor body sidewall selectively sealably engaging the intake side crank plate at the fuel intake port in timed relation with rotor rotation to limit fuel intake to the subchamber, the exhaust side crank plate exhaust port is in communication with a region beyond the chamber and open to the chamber, the rotor body exhaust sidewall valve-controlling exhaust from the subchamber to the region in timed relation with rotor body rotation to limit exhaust from the subchamber to products of fuel mixture combustion, the intake side rotor body sidewall valve-controls fuel mixture intake from the fuel intake port in timed relation with rotor body rotation to limit fuel mixture intake to the subchambers, the rotor body intake structure further comprises an intake recess in the crank-engaged rotor body sidewall larger than and arranged to register with the fuel mixture intake port and a rotor body intake passage from the intake recess through the rotor body to a the subchamber for fuel mixture compression in timed relation with rotor body rotation to limit fuel intake to the subchambers, the intake recess is arcuately extended for extended registration with the fuel mixture intake port during rotor body rotation, the rotor body exhaust structure further comprises an exhaust recess in the crank-engaged rotor body sidewall larger than and arranged to register with the exhaust port and the rotor body exhaust passage from the exhaust recess through the rotor body from the subchambers for exhaust in timed relation with rotor body rotation to have combustion products exhaust from limited to combustion products in the subchamber, and/or the exhaust recess is arcuately extended for extended registration with the exhaust port during rotor body rotation.

In a highly particular embodiment the invention provides an internal combustion rotary engine comprising a chamber having a triangular and curvilinear perimeter wall, a chamber intake sidewall and an opposed chamber exhaust sidewall spaced apart by the perimeter wall, a rotor having a rotor body that rotates about a center hub within the chamber, the rotor body having a curvilinear rotor peripheral wall, a rotor body intake side sidewall and a rotor body exhaust side sidewall oppositely facing and spaced apart by the rotor peripheral wall, the rotor peripheral wall opposing and sealingly engaging the chamber perimeter wall and the intake and exhaust sidewalls respectively, a fuel mixture supply to the chamber, a spark generation structure adjacent the chamber and selectively blocked from access to the chamber by the rotor, an output shaft extending beyond the chamber, the chamber and rotor body being relatively shaped for rotor rotation and continuous and dynamic three locus sealing contact of the chamber perimeter wall and the rotor peripheral wall to define simultaneously responsive to the rotor rotation three subchambers with progressively varying expanding and contracting volumes and progressively differing functions including sequential fuel mixture compression, transfer, fuel mixture combustion, and fuel mixture combustion product exhaust, a compressed fuel mixture lock arranged for the transfer, an intake side crank plate connected to the rotor body hub, the intake sidewall journaling the intake side crank plate, an exhaust side crank plate, the exhaust and intake side crank plates each being connected to the rotor body hub for rotating the rotor oppositely to the rotation of the crank plates, the sidewall journaling the exhaust side crank plate, the crank plates being coupled axially to the output shaft, a fuel mixture path from the fuel mixture supply through the intake side crank plate and through the rotor body to the compression subchamber including a relatively nonextended intake port in the intake side crank plate and a cooperating relatively extended, arcuate intake recess and intake passage in the rotor body arranged to selectively communicate the fuel mixture supply with the subchambers when the intake port and the intake recess and intake passage are mutually registered and the subchambers are undergoing expansion to draw the fuel mixture into the subchambers, and otherwise block communication of the fuel mixture supply with the subchambers with the rotor body intake sidewall, a combustion product exhaust path from the subchambers through the rotor body and the exhaust side crank plate to beyond the chamber including an exhaust port in the exhaust side crank plate and a cooperating relatively extended, arcuate exhaust recess and exhaust passage in the rotor body arranged to selectively communicate the subchambers with a region beyond the chamber, and a spark channel through the rotor for selectively opening the subchambers to the spark generation structure for compressed and transferred fuel mixture ignition in timed relation with compression and exhaust of the fuel mixture, whereby the rotation of the rotor drives the output shaft angularly oppositely on the axis of the crank plates via the crank plates.

In its method aspects the invention contemplates a method of operating an internal combustion rotary engine having three volume variable subchambers progressively defined by a rotor rotating in a chamber and opposed crank plate faces of chamber-journaled intake and exhaust crank plates, the cranks being drivingly connected to the rotor, including successively in each subchamber in time-offset relation passing a fuel mixture from a supply through a rotating crank plate to its the crank face, intaking the fuel mixture into the rotor and thence into the subchambers from the face, compressing the fuel mixture in the subchambers, transferring the compressed fuel mixture past the rotor into a fuel lock open in each the subchamber during fuel mixture compression, returning the compressed fuel mixture to the subchambers, igniting the compressed and transferred fuel mixture with a spark communicated to the subchambers through the rotor to drive the rotor and the crank plates angularly, passing the fuel mixture combustion products through the rotor from the subchambers and thence through the exhaust crank plate face to a region beyond the chamber, and driving an output shaft with the crank plates.

BRIEF DESCRIPTION OF THE DRAWINGS

The invention will be further described in conjunction with the attached drawings, in which.

DETAILED DESCRIPTION

Overview

The Functional Drive Mechanism

Figure 3:
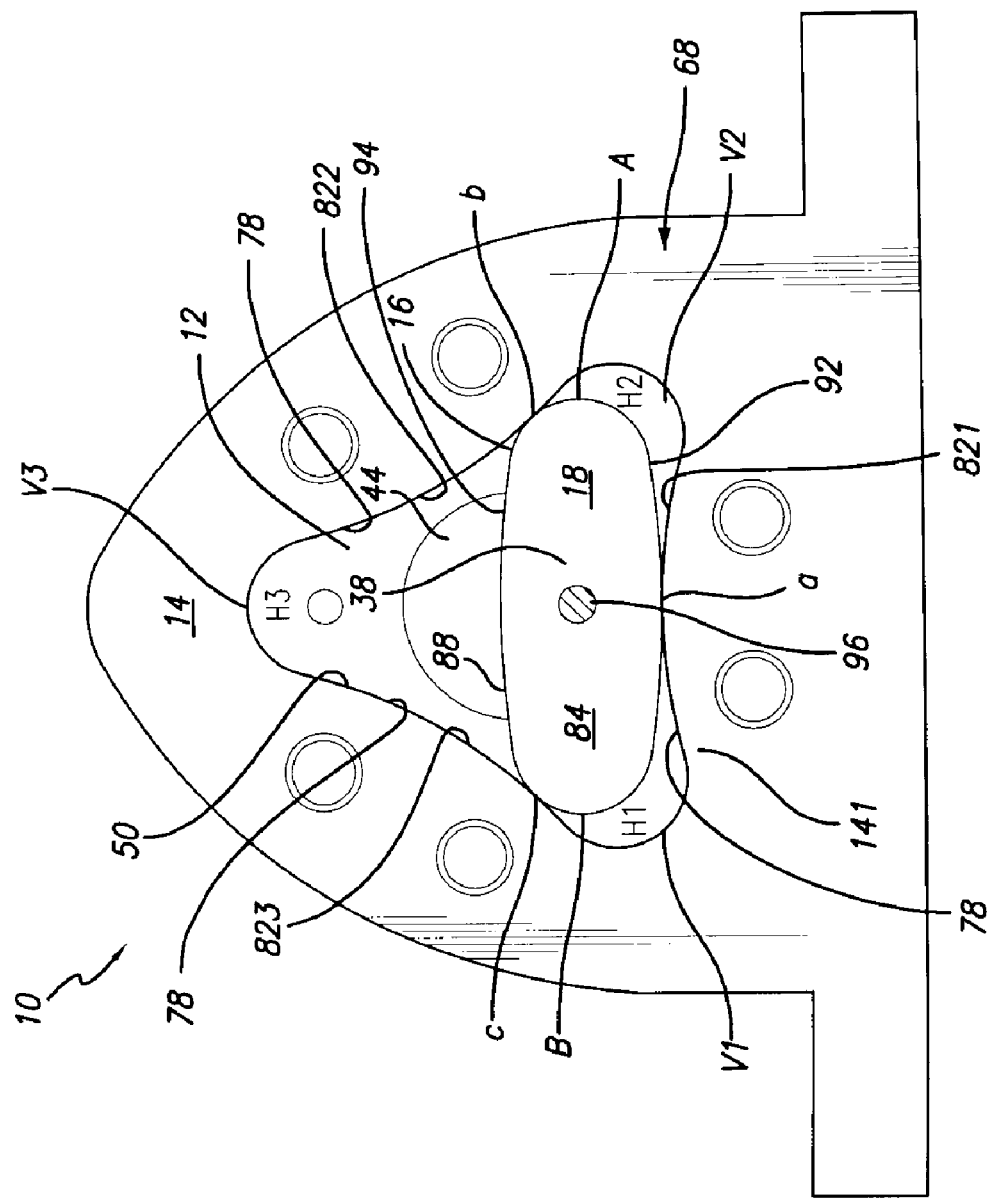
FIG. 3 is a schematic frame view of the engine chamber interior and rotor with the crank removed.

The invention drive mechanism allows operation as a pump, motor or engine and has these features, cf. FIG. 3:

1) The circular drive of the crank plates imparts rotation to the rotor at all times. A force couple, created by the crank turning against the inward curve of the chamber sides, imparts rotation of the rotor at the three angles when the rotor long axis is exactly tangent to the motion of the crank and rotation is disadvantaged, e.g. an axle rotation angle of nominally 0° is one of the disadvantaged angles.

2) Two sides of the rotor and an apex maintain contact with all sides of the chamber at all rotations and at all times creating expandable and collapsible sealed subchambers providing the three locus sealing contact mentioned herein.

3) The engine, motor or pump mechanism has the simplicity of having only two moving parts, yet three working chambers (H1, H2 and H3 in FIG. 3) result. In the case of an internal combustion engine, prospects arise for an engine being obtained comparable to a conventional three piston engine contained within a very simple-to-build housing of two sidewalls and a curved perimeter wall.

Porting and Timing

Fuel inlet and exhaust porting and the timing of opening and closing of the ports to accomplish all the porting functions of an engine are essential in this engine. The invention rotary engine requires having access to four areas: the intake port, the exhaust port, the spark and the fuel-transfer lock (to be more particularly described below). There is need to access these different areas, in connection with whether any one of the three working subchambers is in any one of the six processes: intake, compression, transfer of fuel from in-front-of to behind the rotor, spark for ignition, or exhaust. Each full cycle of the invention engine requires (4*3*6=) 72 porting functions to occur.

While the details of the chamber shape and the complementary rotor shape are developed below, it can be noted here that the inward roundedness of the chamber perimeter wall portions can be adjusted so that an intake port, a hole communicating with a fuel supply and angularly running through the intake crank plate, can always be covered by the rotor. It is necessary that the rotor cover the intake port at all times so that the incoming fuel mixture will be directed to one subchamber at a time and in succession to each subchamber. The rotor thus provides a sliding valve which seals or opens communication between the intake port and the subchambers. An arc-shaped or arcuate intake recess (subtending an angle of the rotor centroid) is provided machined within the flat surface on the intake side sidewall of the rotor to overlap the intake port at specific times and rotational angles. Correlating the overlap of the intake recess on the rotor with the intake port opens a particular working subchamber to the intake port, one which is expanding as the rotor moves through it for drawing in fuel mixture. Fuel mixture in the engine embodiment refers to combustible combination of fuel and an oxidizer such as air. The fuel intake port can be closed to a particular subchamber at just the moment need to impart compression to the fuel mixture. A similar configuration is used on the exhaust side sidewall of the rotor to control the exhaust process for each subchamber. Similarly, a channel is provided to the spark generation structure, typically a sparkplug, to control ignition. And movement of the rotor itself is used to control fuel mixture deposit into fuel transfer locks to put the compressed fuel mixture just compressed by the rotor in the wake of the rotor.

Sliding Face Porting

The invention simple "sliding face" porting system eliminates the need for a camshaft, valves, valve lifters, valve springs, pushrods, timing gear, timing chain, distributor system, and all the things required to time the ignition to the opening and closing of ports in coordination with rotor rotation. The flat, planar, intake side face of the intake crank plate has an intake port angled through the crank to overlap the intake recess in the intake sidewall of the flat, planar face of the rotor. The flat face of the rotor is always contiguous with the flat face of the crank plate to create a sealed communication of the port to the intake recess and internal rotor passage leading to the targeted subchamber. By engaging sealably the differentially rotating faces of the rotor and crank plate, the intake port and the rotor intake recess can be caused to register, or not, based on whether fuel mixture is to be introduced to the selected subchamber or not. With reference now to the drawings in detail, in FIGS. 1-18 an invention internal combustion rotary engine 10 has a chamber 12 defined by chamber walls 14 and a rotor 16 comprising a rotor body 18 in three locus-sealing contact (a, b, c, FIG. 3) with the chamber wall to define a series of subchambers H1, H2, H3 including e.g. a first subchamber H1 for sequential compression, transfer, and combustion of a fuel mixture (from supply S FIG. 1) from a chamber fuel mixture intake 22 and for exhausting combustion products through a chamber exhaust outlet 24 (FIGS. 2, 11-18). The rotor body 18 defines a first bodily internal path 26 (FIGS. 4-10) comprising intake passage 261 for fuel mixture travel from the intake 22 to the first subchamber H1 for the compression, transfer and combustion to combustion products; a second bodily internal exhaust travel path 28 comprising exhaust passage 281 between the combustion products in the first subchamber H1 and the chamber exhaust outlet 24 for exhausting of the combustion products (FIGS. 4-18). Rotor body 18 defines a sealing and sliding valve structure 32 (FIGS. 2,10) with the chamber wall 14 for controlling intake into and exhaust from the first subchamber H1.

Chamber 12 has a spark generation structure 34. Rotor body 18 defines a third bodily internal path 36 between the spark generation structure 34 and the first subchamber H1 for effecting fuel mixture combustion. Rotor body has a central (axial) hub 38 by which it is centrally connected via crank pin 96 (FIGS. 3, 4 and 18) to chamber intake side 42 crank plate 44 and chamber exhaust side 46 exhaust side crank plate 48. Crank plates 44, 48 are journaled in chamber wall 14, more particularly in the chamber wall portions designated chamber intake side sidewall 52 and exhaust side sidewall 54 (FIG. 2) to drive, on the axes A-A of the crank plates, an output shaft 56 coupled to the crank plates directly or indirectly. In operation, rotor body 18 advances angularly about its hub 38 to sweep, i.e. move bodily through, the entire volume of the first subchamber H1. First subchamber H1 defines a compressed fuel mixture lock 60 (e.g. FIG. 4) beyond the sweep of the rotor body 18 for transferring the fuel mixture past the rotor 16 after compression by the advance of the rotor and before combustion in the wake W (FIGS. 5,9) of the rotor. The fuel mixture intake 22 extends through the intake side crank plate 44 to a crank fuel intake port 58 into the chamber 12. The rotor first bodily internal path 26 includes an arcuately extended intake recess 62 selectively registerable with the fuel mixture intake port 58 in fuel intake valve defining relation.

The chamber exhaust outlet 24 extends from an exhaust port 64 from the chamber 12 through the exhaust side crank plate 48 (FIGS. 2, 11-18). The rotor second bodily internal path 28 includes an arcuately extended exhaust recess 66 selectively registerable with the exhaust port 64 in exhaust valve defining relation.

As noted H1 is one of a series of subchambers H1, H2, H3; second and third subchambers H2, H3 have the same structure and cycle of functions as the first subchamber H1, each subchamber including a different chamber vertex V1, V2, V3, respectively, and being arranged to have their cycles offset in time relative to each other. In further detail, the invention internal combustion rotary engine 10 comprises an assembly 68 of a chamber 12 and a rotor 16. Rotor 16 has a body 18 with a central hub 38, the rotor body defining within the chamber three subchambers H1, H2, H3 each at least partly defined by opposed intake and exhaust crank plates 44, 48 connected to the rotor body hub and each providing successively in time offset relation sequential compression, combustion and exhaust functions. Engine rotor body 18 further includes a spark generation structure 34, a fuel mixture supply S, and an output shaft 56 coupled to a the crank plate, generally exhaust crank plate 48. The rotor body 18 has a rotor intake structure 72 (FIG. 4) selectively and in sequence communicating through the rotor body the fuel mixture supply S to each subchamber H1, H2, H3 for compression, transferring past the rotor body and combustion, and communicating through the rotor body the spark generation structure 34 with compressed fuel mixture for combustion thereof.

Figure 1:
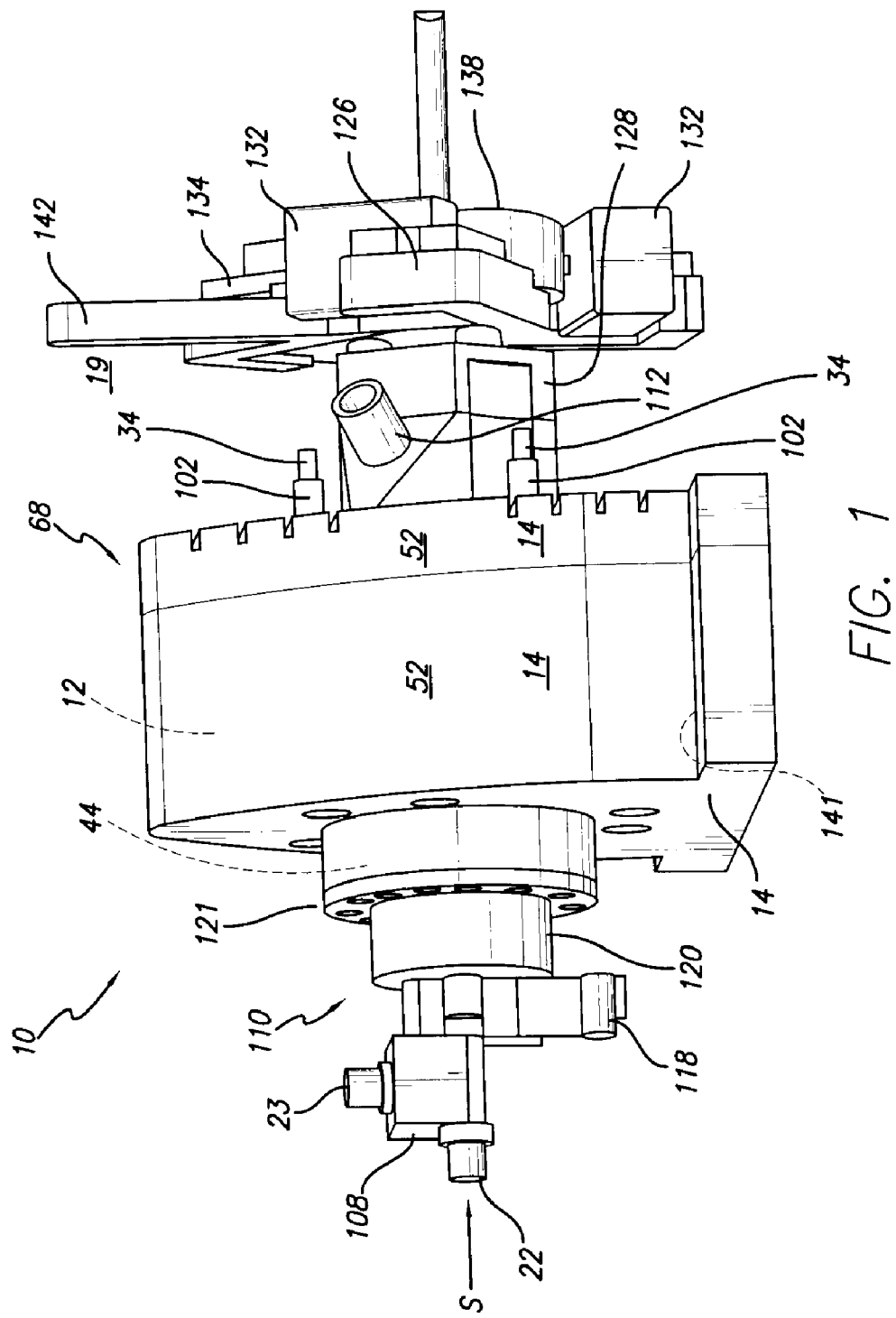
FIG. 1 is side elevational view of an embodiment of the internal combustion rotary engine according to the invention.
Figure 2:
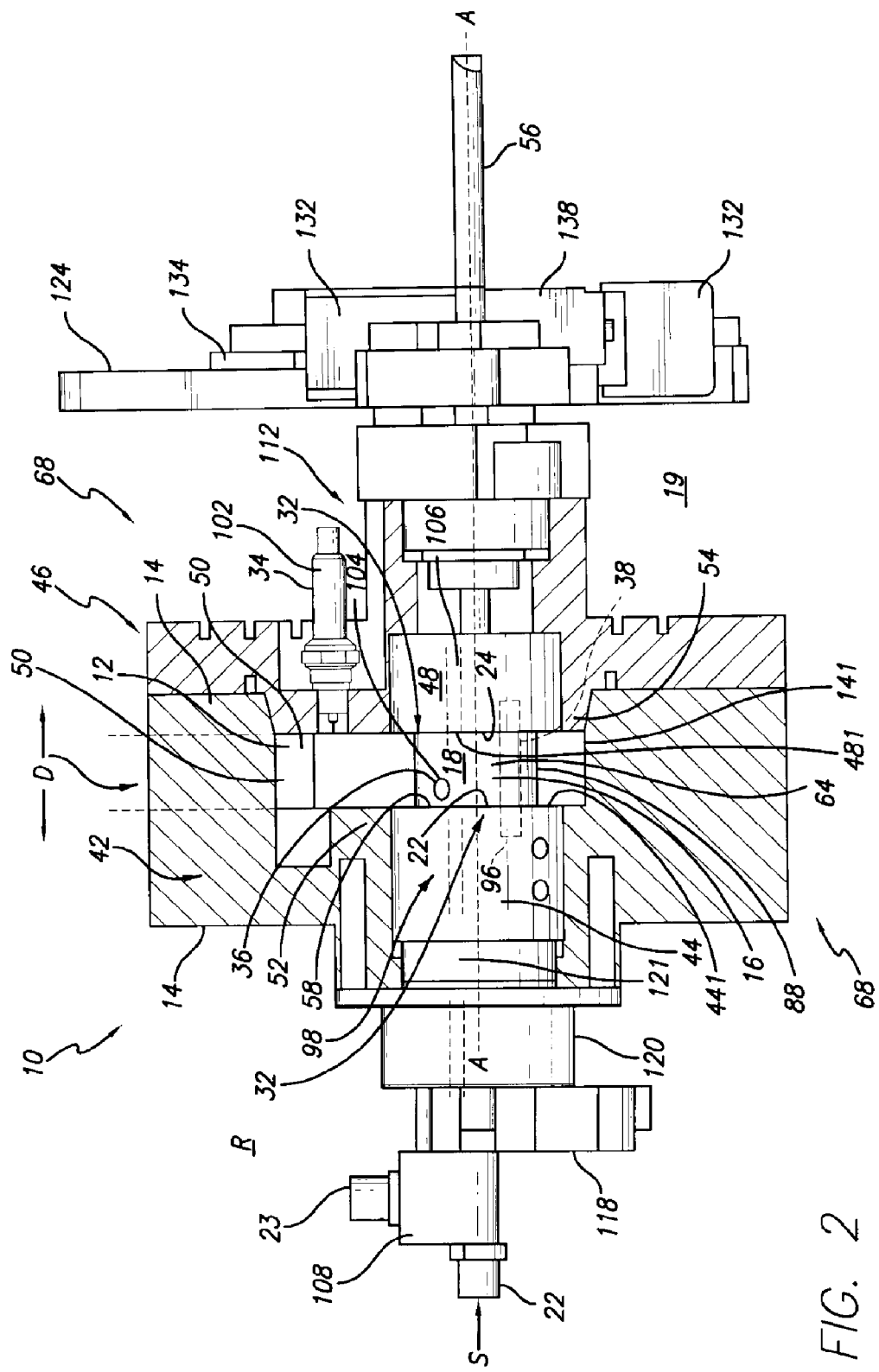
FIG. 2 is a side section view thereof.

Rotor body 18 further has a rotor exhaust structure 74 (FIG. 11) selectively communicating through the rotor body subchamber (H1, H2, H3) combustion by products for exhaust to a region 19 beyond the chamber 12 (FIGS. 1,2). The noted operations: separate, successive cycles of compression, transfer, combustion and exhaust in each subchamber H1, H2 and H3, offset in time between subchambers, occur in timed relation to drive the output shaft 56 with the rotor body 18 via the rotor-coupled and output shaft-connected crank plates 44 and/or 48.

The chamber 12 and rotor body 18 are relatively shaped for rotor rotation in continuous and dynamic three locus sealing contact (a, b, c, FIG. 3) of the chamber and the rotor body to define the subchambers H1, H2, H3. These subchambers H1, H2, H3 are simultaneously responsive to rotor 16 rotation to have progressively varying expanding and contracting volumes for respective compression, combustion and exhaust functions as described in more detail hereinafter. The chamber 12 wall 14 includes intake and exhaust side sidewalls 52, 54 and a depth D (FIG. 2). Depth D (or thickness of the chamber 12) is defined by a generally triangular, curvilinear perimeter wall 50 that spaces the chamber intake and exhaust sidewalls 52, 54. To maintain the three locus contacts a, b and c, chamber wall 14 has on the sides 78 (corresponding to triangle sides) three equally spaced, relatively angularly disposed, symmetrical, inwardly convex chamber surfaces 821, 822, 823 joined by the three vertices V1, V2, V3 (FIGS. 3, 4, 7, 13).

The rotor body 18 complementarily has oppositely facing rotor sidewalls 84, 86 and a curvilinear outwardly peripheral wall 88. Rotor body 18 further has two oppositely facing outwardly convex major rotor surfaces 92, 94 and two apexes A, B (FIGS. 3,4) spaced by the rotor sidewalls 84, 86 and joining the major rotor surfaces that are cooperatively shaped relative to said chamber surfaces 821, 822, 823 to have continuous and dynamic three locus sealing contact a, b, c of the chamber wall 14 and the rotor body 18.

Chamber wall 14 includes intake side wall 52 for fuel mixture intake to the chamber 12 from the supply S. Chamber sidewall 52 further journals (supports for rotation) the intake side crank plate 44. Intake side crank plate 44 is connected to the rotor central hub 38 by crank pin 96. Chamber intake exhaust side wall 54 journals the exhaust side crank plate 46. Exhaust side crank plate 46 is also connected to the rotor body central hub 38 by the crank pin 96.

The intake side crank plate 44 provides a crank defined fuel mixture path 98 from the fuel mixture supply S to the rotor body intake structure 72 (FIG. 2). Exhaust side crank plate 48 provides an exhaust port 64 communicating with exhaust outlet 24 and the subchambers H1, H2, H3 to region 19 beyond the chamber 12.

Spark generation structure 34 includes a spark plug 102 carried by the chamber 12, one for each subchamber H1, H2, H3, and a spark communicating structure 104 through the rotor body 18 for selectively communicating the spark plug with compressed fuel mixture in a subchamber H1, H2, H3 responsive to rotor body rotation within the chamber 12.

In summary, the chamber 12 has an exhaust side sidewall 54 journaling the exhaust crank plate 48, an intake side sidewall 52 journaling the intake side crank plate 44, the crank plates being crank pin 96-coupled to the rotor hub 38. The intake side crank plate 44 has a fuel intake port 58 in communication with the fuel supply S and open to the chamber 12. The rotor body sidewall 84 opposite the intake side crank plate 44 selectively sealably engages the intake side crank plate at the fuel intake port 58 in timed relation with rotor 16 rotation to limit fuel intake to the chamber 12. Further, the rotor body 18 has an exhaust side rotor body sidewall 86 opposite the exhaust side crank plate 48, the chamber 12 has an exhaust side sidewall 54 opposing the exhaust side rotor body sidewall 86, the exhaust side crank plate 48 is journaled by the chamber exhaust side sidewall, the exhaust side crank is crank pin 96-coupled to the rotor body central hub 38, the rotor body exhaust sidewall valve-controlling exhaust from a subchamber to the region 19 in timed relation with rotor body rotation to limit exhaust from the subchamber to products of fuel mixture combustion.

Further, the intake side crank plate 44 has a fuel intake port 58 in communication with the fuel mixture supply S and open to the chamber 12, the intake side rotor body sidewall 84 valve-controlling fuel mixture intake from the fuel intake port 58 in timed relation with rotor body rotation to limit fuel mixture intake to a subchamber. The rotor body 18 intake side rotor sidewall 84 sealably engages the intake side crank plate 44 at the intake port 58. Rotor body intake structure 72 comprises the intake recess 62 in the crank plate 44-engaged rotor body sidewall 84 larger than and arranged to register with the fuel mixture intake port 58 and a rotor body intake passage 261 from the intake recess 62 through the rotor body 18 to a subchamber H1, H2, H3 depending on which subchamber is at the beginning of its cycle, for fuel mixture compression in timed relation with rotor body rotation to limit fuel intake to the subchamber for compression. Intake recess 62 is arcuately extended for registration with the fuel mixture intake port 58 during rotor body rotation. The exhaust side crank plate 46 is journaled by the chamber 12 and includes an exhaust port 64 open to the chamber. Rotor body 18 has an exhaust side rotor sidewall 86 sealably engaging the exhaust side crank plate 48 at the exhaust port 64. The rotor body exhaust structure 74 (FIG. 11) comprises an exhaust recess 66 in the crank-engaged rotor body sidewall 86 larger than and arranged to register with the exhaust port 64 and the rotor body exhaust passage 281 from the exhaust recess through the rotor body 18 from a subchamber for exhaust in timed relation with rotor body rotation to have combustion products exhaust from a subchamber limited to combustion products in the subchamber. As with the intake recess 62, the exhaust recess 66 is arcuately extended for extended registration with the exhaust port 64 during rotor body 18 rotation.

In a further embodiment, the invention provides an internal combustion rotary engine 10 comprising an assembly 68 of a chamber 12 and rotor 16. Rotor 16 has a body 18 with a central hub 38. The chamber 12 and rotor body 18 are relatively shaped as shown for rotor rotation in continuous and dynamic three locus sealing contact a, b, c of the chamber and the rotor body to define three subchambers H1, H2, H3 that are simultaneously responsive to rotor rotation to have progressively varying expanding and contracting volumes for respective compression, combustion and exhaust functions, each subchamber being at least partly defined by opposed intake and exhaust crank plates 44, 48, crank-pin-96-connected to the rotor body hub 38. The engine 10 further includes a spark generation structure 34, a fuel mixture supply S such as a carburetor 108, and an output shaft 56 coupled to a crank 44 and/or 48. The rotor body 18 has rotor intake structure 72 selectively and in sequence communicating through the rotor body the fuel mixture supply S to the subchambers H1, H2, H3 for compression, transferring past the rotor body 18, and combustion, and communicating through the rotor body the subchambers with the spark generation structure 34 for fuel mixture combustion, the rotor having rotor exhaust structure 74 (FIG. 11) selectively communicating through the rotor body the subchambers for exhaust to a region 19 beyond the chamber, all in timed relation to drive the output shaft 56 with the rotor body via the rotor-coupled and output shaft-connected crank plates e.g. 44, 48.

As noted, the chamber has intake and exhaust side sidewalls 52, 54, a depth D defined by a generally triangular, curvilinear perimeter wall 50 spacing the chamber intake and exhaust sidewalls and defining three equally spaced, relatively angularly disposed, symmetrical, inwardly convex chamber surfaces 821, 822, 823 joined by three vertices V1, V2, V3. Rotor body 18 has oppositely facing rotor sidewalls 84, 86, a curvilinear outwardly peripheral wall 88 providing two oppositely facing outwardly convex major rotor surfaces 92, 94 that either effect the compression of fuel mixture or are driven by the explosion of combusting fuel mixture and two apexes A, B spaced by the rotor sidewalls and joining the major rotor surfaces cooperatively shaped to have continuous and dynamic three locus sealing contact a, b, c of the chamber wall 14 and the rotor body 18. The exhaust side crank plate 48 is journaled in the chamber exhaust side wall 54 and provides an exhaust port 64 for combustion products through the exhaust side crank plate from the rotor exhaust structure 74. Spark generation structure 34 includes a spark plug 102 carried by the chamber sidewall 54, and a spark communicating structure 104 through the rotor body 18 selectively communicating the spark plug with compressed fuel mixture in the subchambers H1, H2, H3 responsive to rotor body rotation within the chamber 12. The intake side crank plate 44 has a fuel intake port 58 in communication with the fuel supply S and open to the chamber 12, the rotor body sidewall 84 selectively sealably engaging the intake side crank plate 44 at the fuel intake port 58 in timed relation with rotor rotation to limit fuel intake to a selected subchamber. The exhaust side crank plate 48 exhaust port 64 is in communication with a region 19 beyond the chamber 12 and open to the chamber, the rotor body exhaust sidewall 86 valve-controlling exhaust from the subchamber to the region in timed relation with rotor body rotation to limit exhaust from the subchamber to products of fuel mixture combustion. The intake side rotor body sidewall 84 valve-controls fuel mixture intake from the fuel intake port 58 in timed relation with rotor body 18 rotation to limit fuel mixture intake to the subchambers H1, H2, H3. The rotor body intake structure 72 further comprises an intake recess 62 in the intake crank plate 44-engaged rotor body sidewall 84 larger than and arranged to register with the fuel mixture intake port 58 and a rotor body intake passage 261 from the intake recess 62 through the rotor body 18 to a selected subchamber H1, H2, H3 for fuel mixture compression in timed relation with rotor body rotation to limit fuel intake to the subchambers; the intake recess being arcuately extended for extended registration with the fuel mixture intake port during rotor body rotation. The rotor body exhaust structure 74 further comprises an exhaust recess 66 in the crank 46-engaged rotor body sidewall 86 larger than and arranged to register with the exhaust port 64 and the rotor body exhaust passage 281 from the exhaust recess through the rotor body 18 from the subchambers for exhaust in timed relation with rotor body rotation to have combustion products exhaust limited to combustion products in the subchamber.

In a highly particular embodiment the invention provides an internal combustion rotary engine 10 comprising a chamber 12 having a triangular and curvilinear perimeter wall 50, a chamber intake side wall 52 and an opposed chamber exhaust side wall 54 spaced apart by the perimeter wall, a rotor 16 having a rotor body 18 that rotates about its center hub 38 within the chamber, the rotor body having a curvilinear rotor peripheral wall 88, a rotor body intake side sidewall 84 and a rotor body exhaust side sidewall 86 oppositely facing and spaced apart by the rotor peripheral wall, the rotor peripheral wall opposing and sealingly engaging the chamber perimeter wall and the sidewalls 84, 86, the intake and exhaust sidewalls respectively, a fuel mixture supply S to the chamber, a spark generation structure 34 adjacent the chamber and selectively blocked from access to the chamber by the rotor, an output shaft 56 extending beyond the chamber, the chamber and rotor body being relatively shaped for rotor rotation and continuous and dynamic three locus sealing contact a, b, c of the chamber perimeter wall and the rotor peripheral wall to define simultaneously, responsive to the rotor rotation, three subchambers H1, H2, H3 with progressively varying expanding and contracting volumes and progressively differing functions including sequential fuel mixture compression, transfer, fuel mixture combustion, and fuel mixture combustion product exhaust, a compressed fuel mixture lock 60 arranged for the transfer, an intake side crank plate 44 connected to the rotor body hub 38, the intake side wall journaling the intake side crank plate, an exhaust side crank plate 48, the exhaust and intake side crank plates each being crank pin 96-connected to the rotor body hub for rotating the rotor oppositely to the rotation of the crank plates, the exhaust sidewall journaling the exhaust side crank plate, the crank plates being coupled axially to the output shaft 56, a fuel mixture path 98 from the fuel mixture supply S through the intake side crank plate and through the rotor body to a subchamber including a relatively nonextended intake port 58 in the intake side crank plate and a cooperating relatively extended, arcuate intake recess 62 and passage 261 in the rotor body arranged to selectively communicate the fuel mixture supply with the subchambers when the intake port and the intake recess and intake passage are mutually registered and the subchambers are undergoing expansion to draw the fuel mixture into the subchambers, and otherwise block communication of the fuel mixture supply to the subchambers with the rotor body intake side wall, a combustion product exhaust path 112 from the subchambers through the rotor body and the exhaust side crank plate to beyond the chamber including an exhaust port 64 in the exhaust side crank plate and a cooperating relatively extended, arcuate exhaust recess 66 and exhaust passage 281 in the rotor body arranged to selectively communicate the subchambers with a region 19 beyond the chamber, and a spark channel or path 36 through the rotor for selectively opening the subchambers to the spark generation structure 34 for compressed and transferred fuel mixture ignition in timed relation with compression and exhaust of the fuel mixture, whereby the rotation of the rotor drives the output shaft 56 angularly oppositely on the axis of the crank plates via the crank plates.

In the invention method of operating an internal combustion rotary engine 10 having three volume variable subchambers H1, H2, H3 progressively defined by a rotor 16 rotating in a chamber 12 and opposed crank plate faces 441, 481 of chamber-journaled intake and exhaust crank plates 44, 48 the cranks being drivingly connected to the rotor, including successively in each subchamber in time-offset relation passing a fuel mixture from a supply S through a rotating crank plate 44 to its crank face 441, intaking the fuel mixture into the rotor and thence into the subchambers from the crankface, compressing the fuel mixture in the subchambers, transferring the compressed fuel mixture past the rotor into a fuel lock 60 open in each subchamber during fuel mixture compression, returning the compressed fuel mixture to the subchambers, igniting the compressed and transferred fuel mixture with a spark communicated to the subchambers through the rotor to drive the rotor and the crank plates angularly, passing the fuel mixture combustion products through the rotor from the subchambers and thence through the exhaust crank plate face 481 to a region 19 beyond the chamber, and driving an output shaft 56 with the crank plates.

With reference particularly to FIGS. 1 and 2, the internal combustion rotary engine is shown in overview at 10 and includes a carburetor 108 that creates the fuel mixture, a throttle 118, Timken bearing 119, intake cover 120, chamber 12, an intake side plate or crank 44, rotor 16, an exhaust side plate or crank 48, three spark plugs 102, three magnetos 132, flywheel 138, magnets 140, axle or output shaft 56, magneto holder 126 and spark advance and retardation handle 142. With particular reference now to FIGS. 4 through 18, these Figures are see-through wire frame drawings taken in a plane to show the inner mechanism at various transitions. These Figures also show the intake or exhaust chamber plates 44, 48, the plate faces 441, 481, the rotor 16 and its recesses 62, 66 and intake passage and outlet passages 261, 281. The smaller arcuate recess 62 is the intake recess. The intake port 58 is a hole which revolves with the crank plate 44. The intake port 58 is at the interface of the intake internal path 26 with the rotor body 18 intake side surface 84 which interfaces or overlaps the intake recess 62 on the rotor. In the sequence of FIGS. 4 through 10, the viewpoint is the crankshaft turning CCW and the rotor turning CW. In the sequence of FIGS. 11 through 18, the view is the mirror image of the functional areas where the crankshaft turns CW and the rotor is turning CCW.

The Sequential Functions of the Engine

Figure 4:
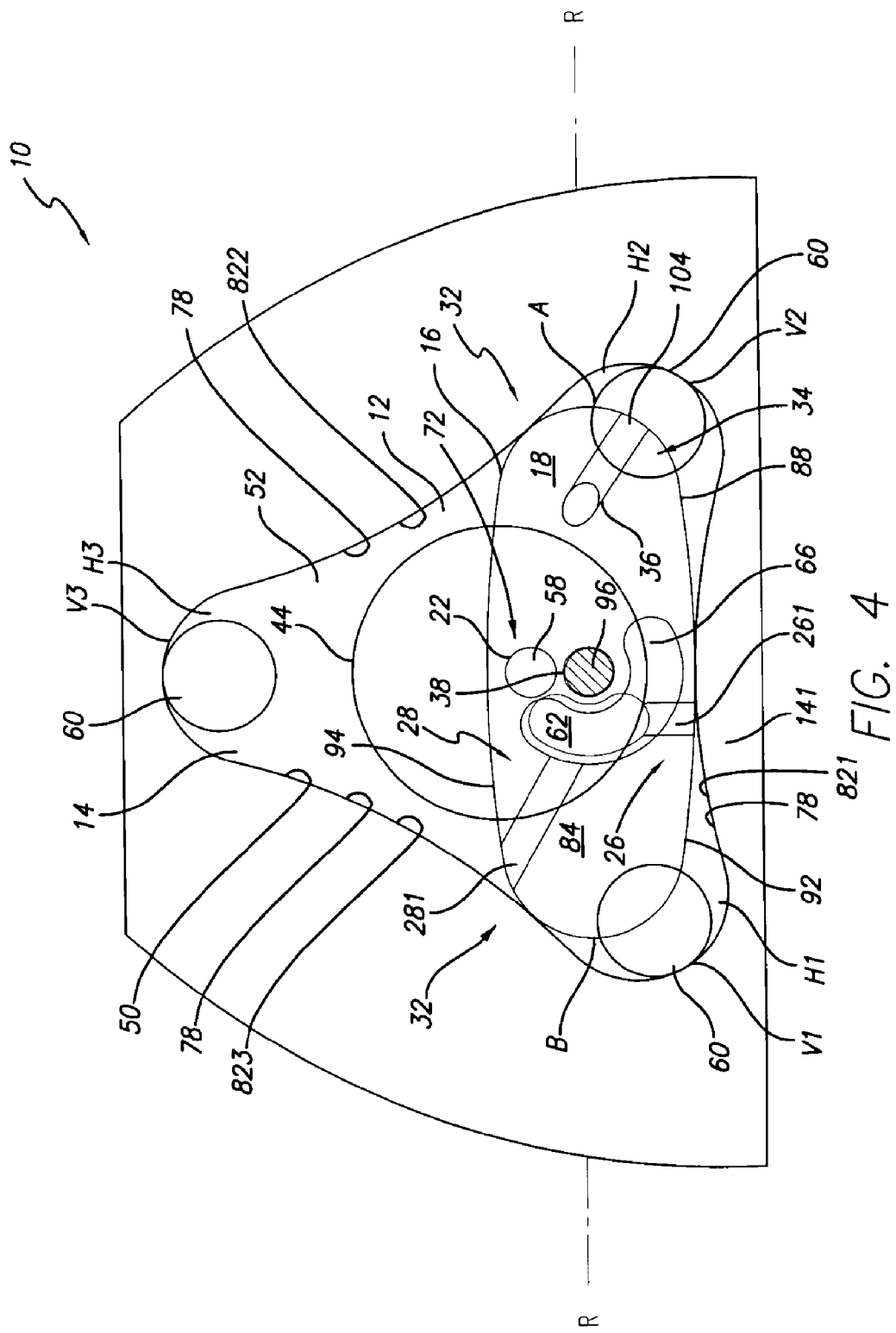
FIGS. 4-10 are schematic frame views of the chamber and rotor showing the progression of the rotor through its cycle as viewed from the chamber intake side, the rotor turning counterclockwise (CCW), primarily with reference to the intake, compression and combustion aspects of the invention engine.

In FIGS. 4-10 the working subchambers H1, H2 and H3 are open faced with the exhaust chamber plate 48 removed. In FIG. 4, the rotor 16 is in its initial position with the long axis R-R of the rotor parallel to the base 141 of the chamber 14. The crank plate 44 is in its initial position with the crank pin 96 in its most downward position, closest to the base 141 of the chamber 12. The crank plate 44 is said to be at 0° axle rotation when in its initial position. Several features appear including the working chambers H1, H2, and H3 between the outline of the chamber sides 821, 822, 823 and the outline of the rotor 16, the small arcuate shape recess is the intake recess 62, and extending downward there is intake passage 261. The outline of the intake port 58 appears. Most importantly, the rotor's intake recess 62 is interfacing with the intake port 58. Also visible (albeit in a different plane) is the larger arcuate recess 66 which is the exhaust recess. There is an exhaust passage 281 formed by a hole through the rotor 16, and a further hole forming a spark channel or spark path 36 to allow access of the sparkplug 102 spark to the working subchamber (in this case working subchamber H2). Apexes A and B indicate the orientation of the rotor 16. At the moment in time shown in FIG. 4, the intake recess 62 is just interfacing with and ready to overlap with the intake port 58. So fuel mixture from supply S (FIG. 2) is just ready to be drawn into the rotor intake recess 62 through the short length of intake passage 261 into the H1 working chamber because of the influence of an expanding sealed working chamber H1 in the wake W (FIG. 5) of rotor 16 as the rotor moves clockwise through subchamber H1.

Figure 5:
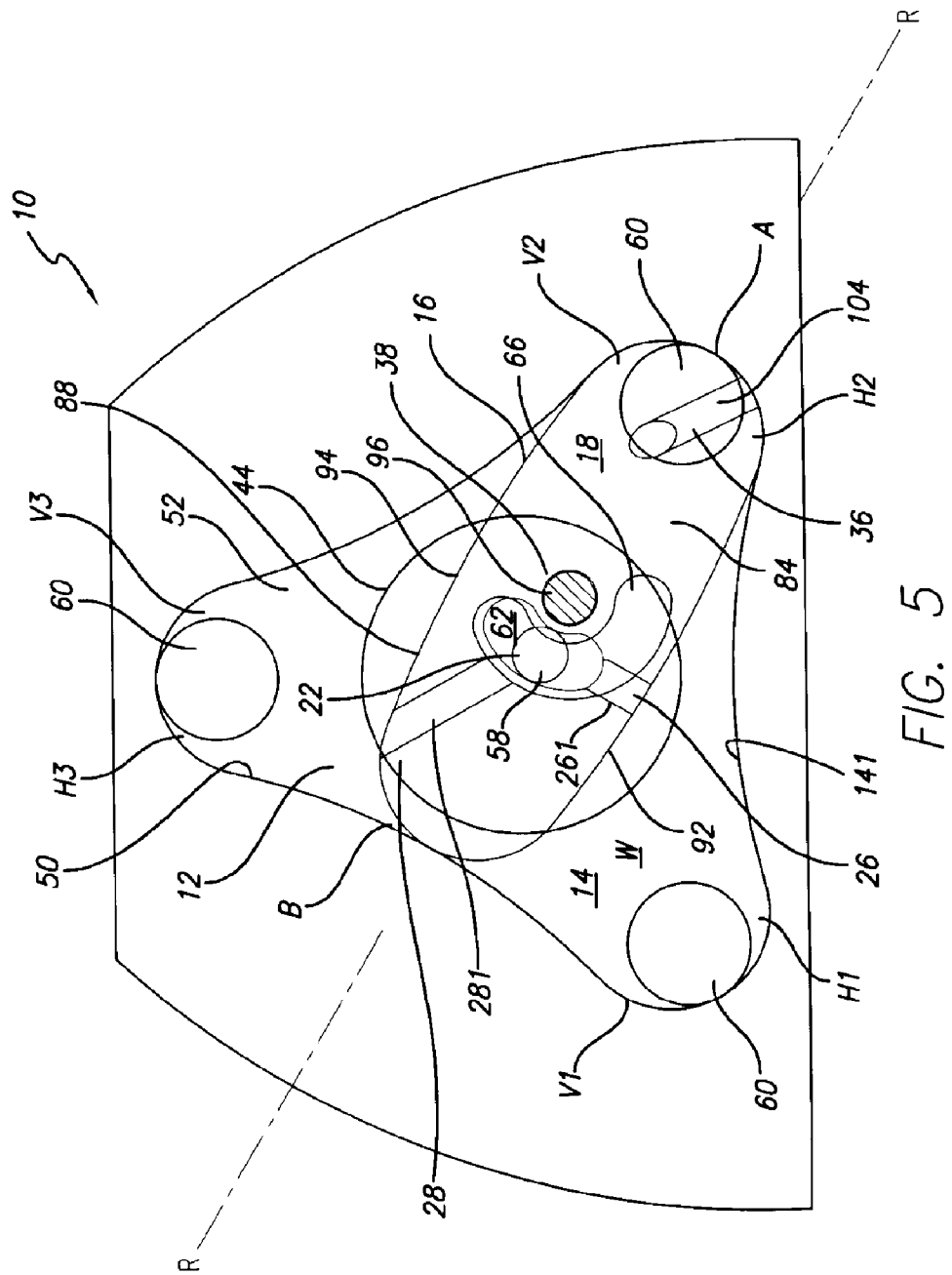

FIG. 5 shows subchamber H1 opened as crank pin has turned 60°. The impetus of the crank pin, having been created by a recent explosion in the H3 working subchamber, has turned the axle CCW and has driven the rotor 16 on its pivot (hub 38) CW where its left side, Apex B, is slanting upward. Chamber H1 is now fully involved in drawing in fuel and air mixture, and it can do so because the intake recess 62 is now fully overlapping the intake port 58.

Figure 6:
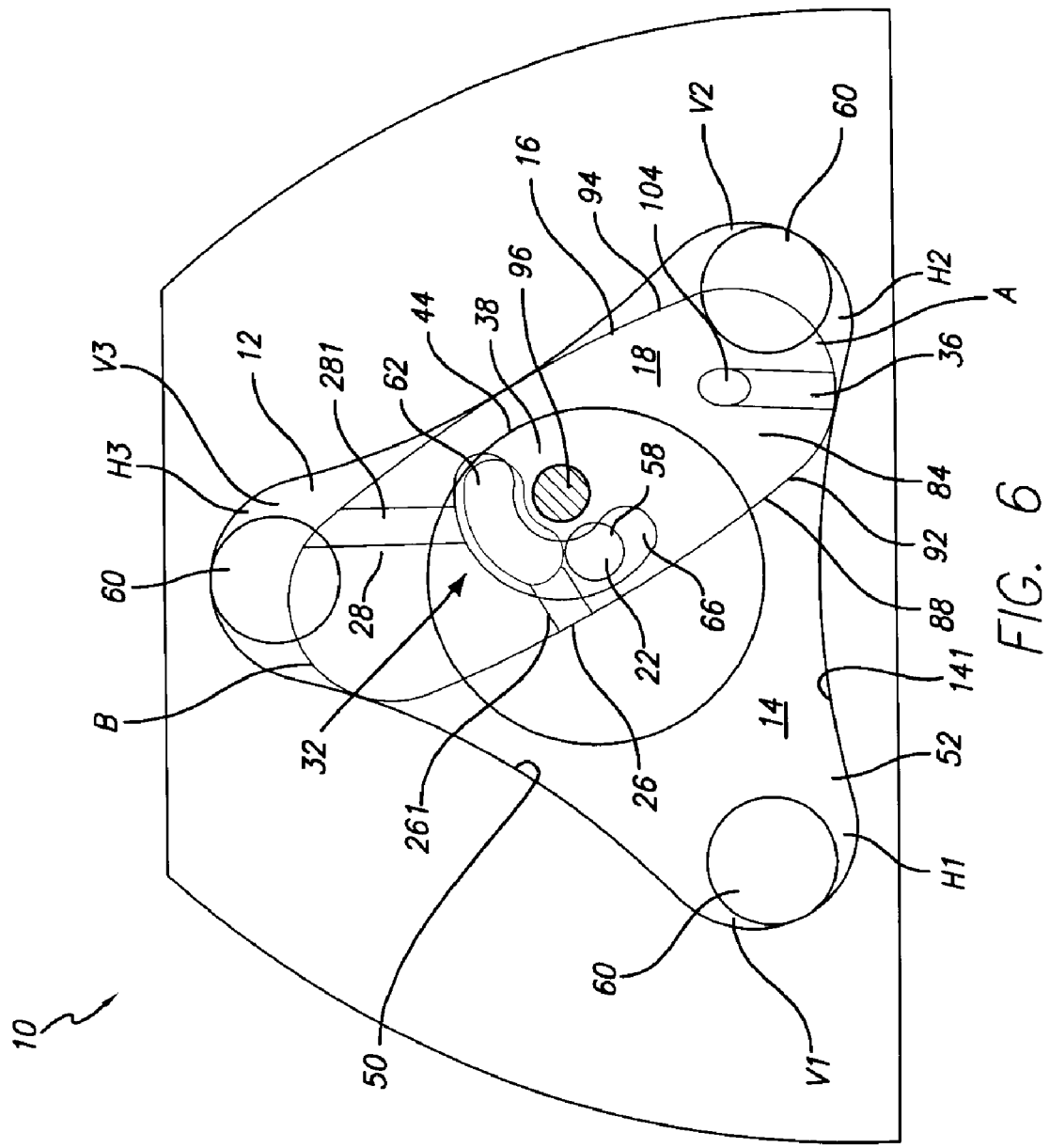
Figure 7:
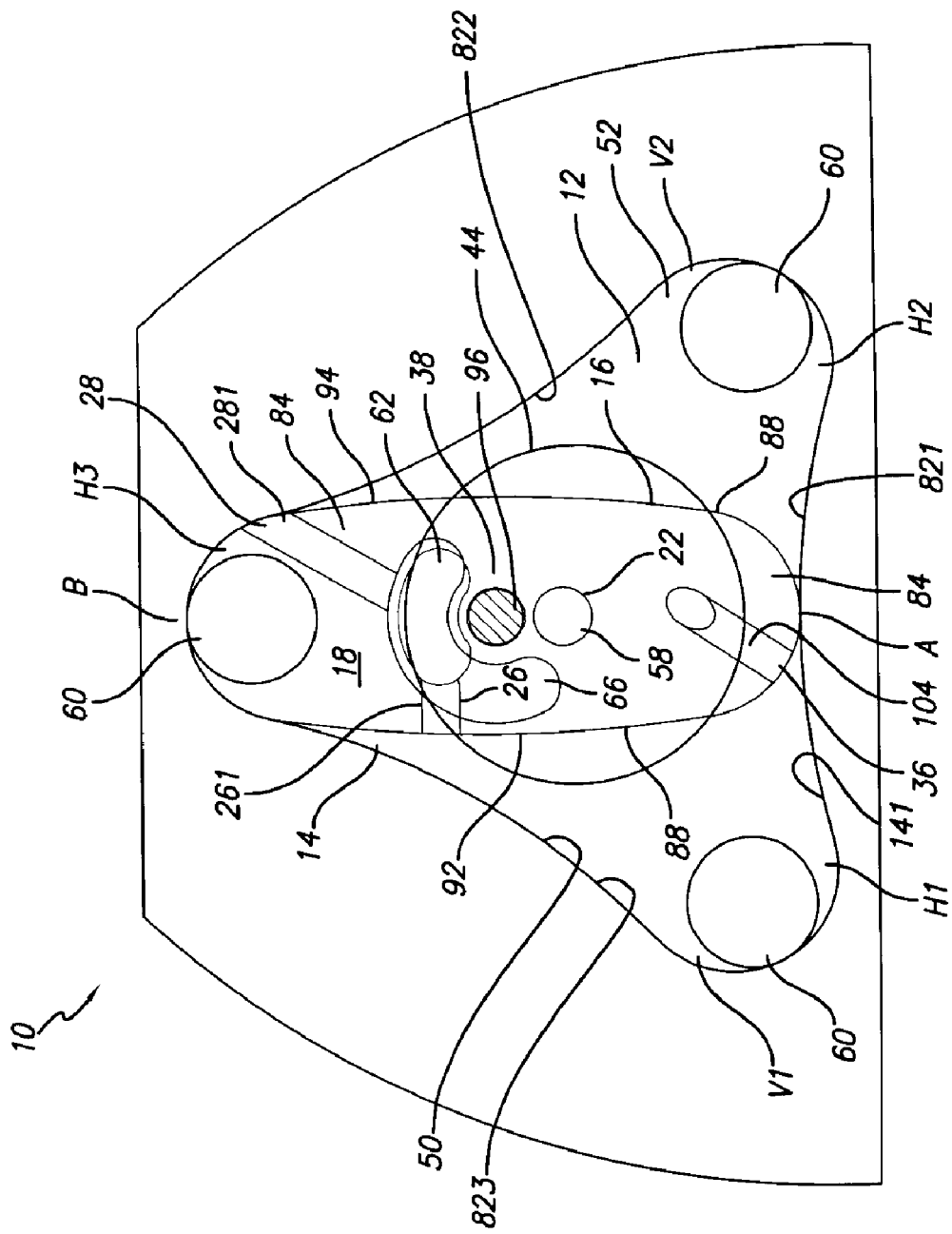

FIG. 6 shows the crank plate 44 rotation advanced to 120° and the rotor 16 is shown tilted up farther. The volume of chamber H1 is now fully maximized. It is seen that the intake port 58 no longer overlaps the intake recess 62, so the intake port has just been closed. When the crank pin 96 rotation reaches 180° as in FIG. 7, the incremental CCW advancement of pin has swung the rotor face 92 CW from the lower right to the lower left, reducing the volume of chamber H1. The rotor 16 now stands vertically and is midway through the compression stage of the engine cycle; subchamber H1 is now compressing the fuel mixture. Note that the rotor intake recess 62 is fully distanced from the intake port 58, closing the port.

Figure 8:
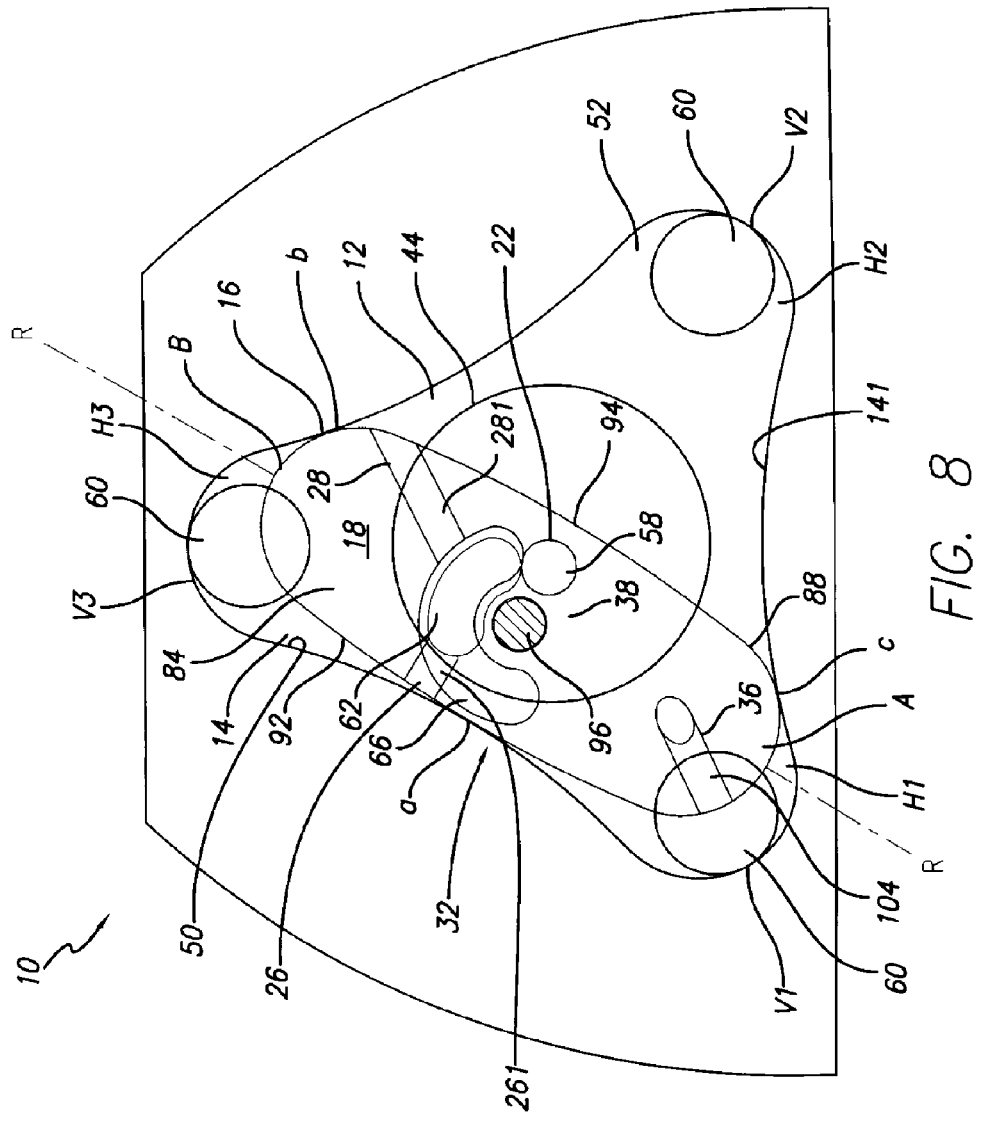

In FIG. 8, the rotor plate 44 continues to turn CCW and drives the arcuate face 92 of the rotor 16 farther to the left; the fuel mixture in subchamber H1 is fully compressed. Note that the intake recess 62 is interfacing with but not overlapping the intake port 58 as the rotation reaches 240°. Also, the intake passage 261 has just shifted from working subchamber H1 to H3.

Figure 9:
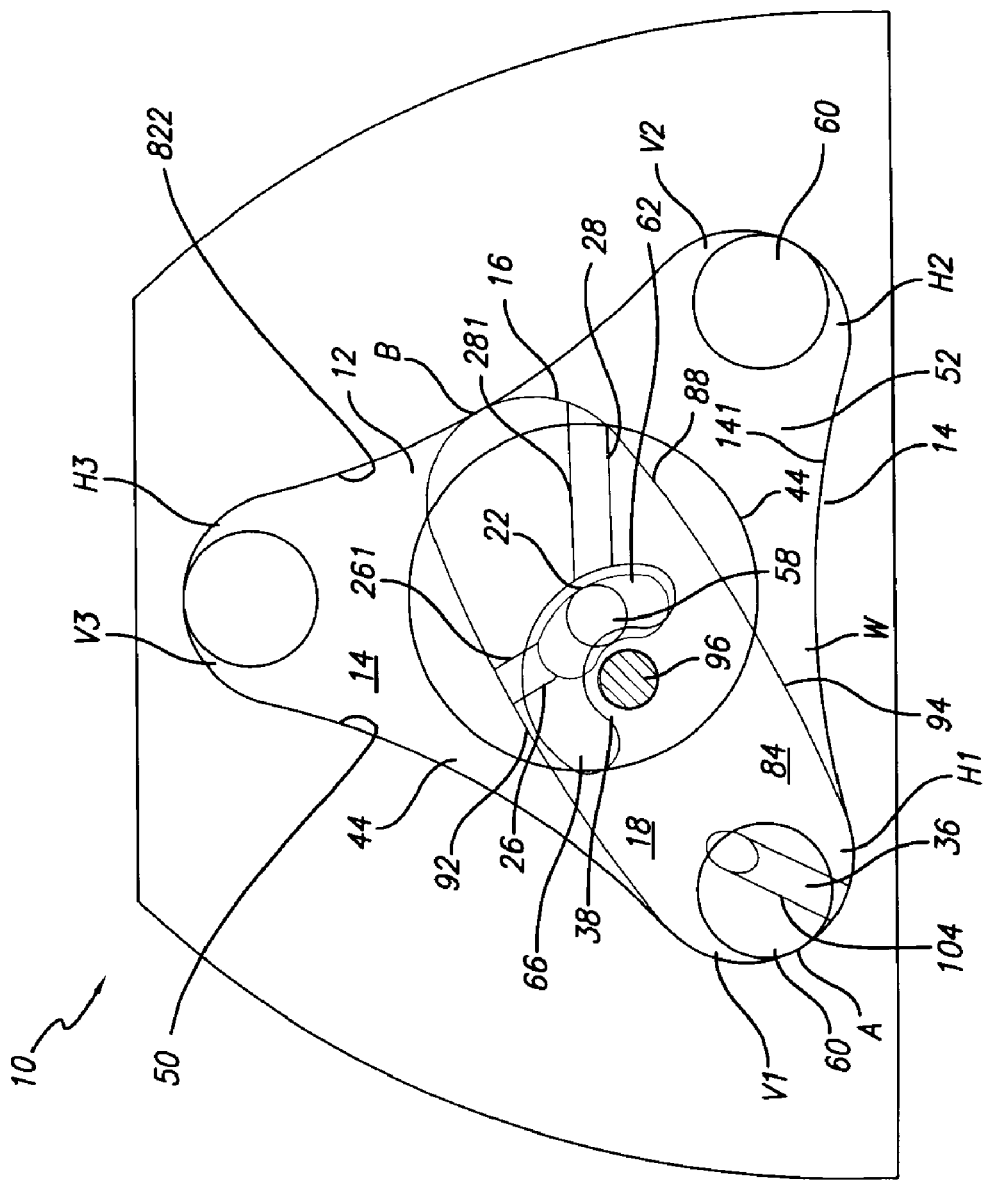

In FIG. 9, as the crank plate 44 continues to rotate CCW, the apex B of the rotor 16 will close and nest in the vertex V1 of the subchamber H1. The nesting reaches its maximum at 300° of crank pin 96 rotation as shown in FIG. 9. The fuel mixture is fully collapsed into the fuel lock 60 indicated as a hole near the vertex V1. The intake recess 62 fully overlaps the intake port 58, but now the intake passage 261 extending bodily through the rotor body 18 has moved on and is pointing to and communicating with working subchamber H3, which is open to intake the fuel mixture.

Figure 10:
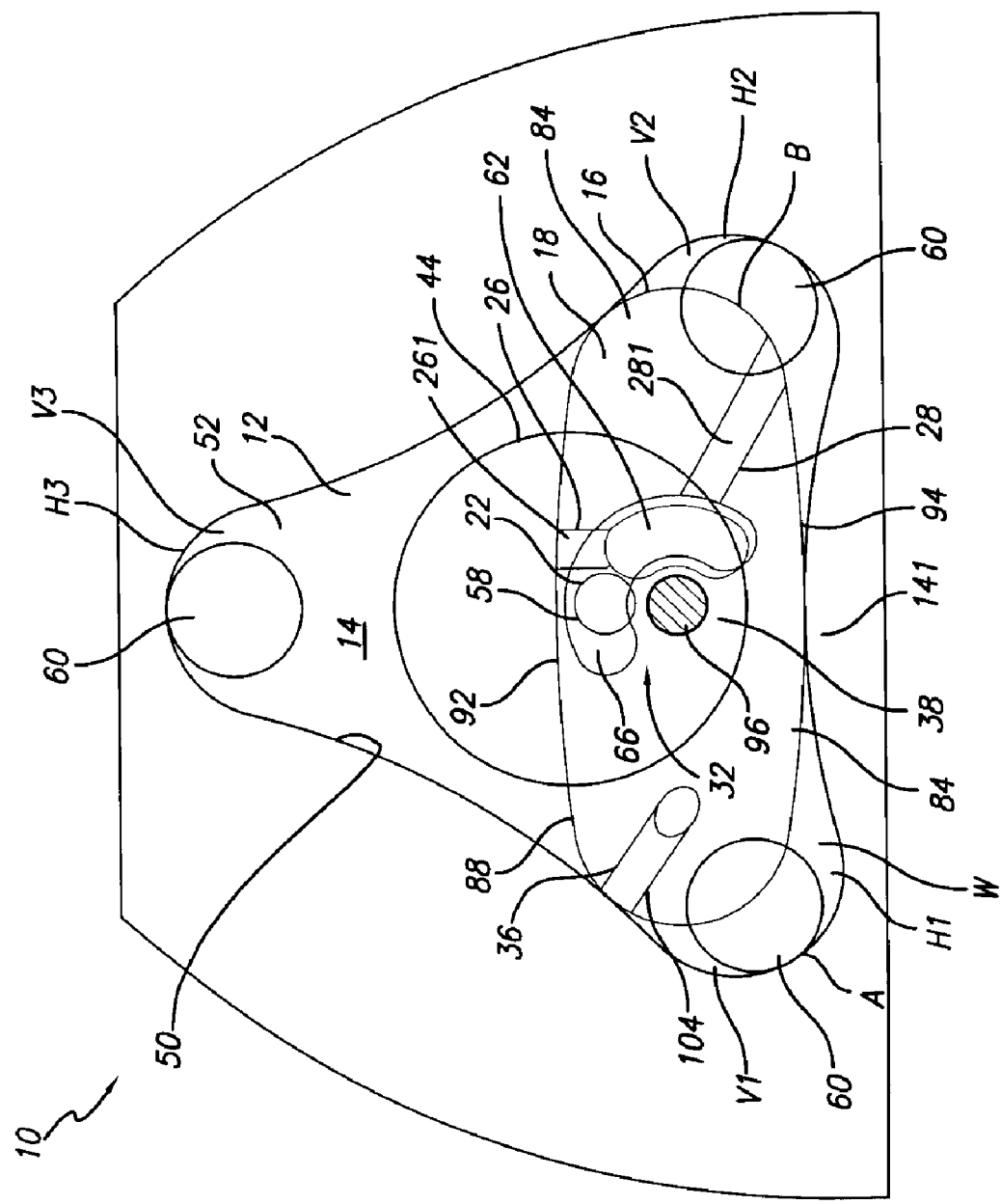

In FIG. 10, the rotor 16 and the pin 96 have rotated a full 360°. The rotor center axis R-R (FIG. 4) is now parallel with the base 141 of the chamber. Fuel mixture now is in both the fuel lock 60 and subchamber H1. Note that the fuel mixture has been transferred from in front of the rotor 16 to behind the rotor to be in the rotor's wake W. Further, the spark channel 36 now opens to working chamber H1 containing the compressed fuel mixture.

Ignition and Explosion

In FIG. 10 the sparkplug channel 36 overlaps working subchamber H1 and is at the last stages of remaining open to working subchamber H1. The spark is timed to occur just as the spark channel 36 overlaps the sparkplug 102 (FIGS. 1,2). Explosion can occur in working chamber H1 anywhere between 300° and 360° rotation, just as long as it occurs after the rotor has passed top-dead-center (TDC) which is at 300°. The spark can be overlapping the spark notch (channel 36) even before TDC, depending upon how slowly the fuel ignites.

Figure 11:
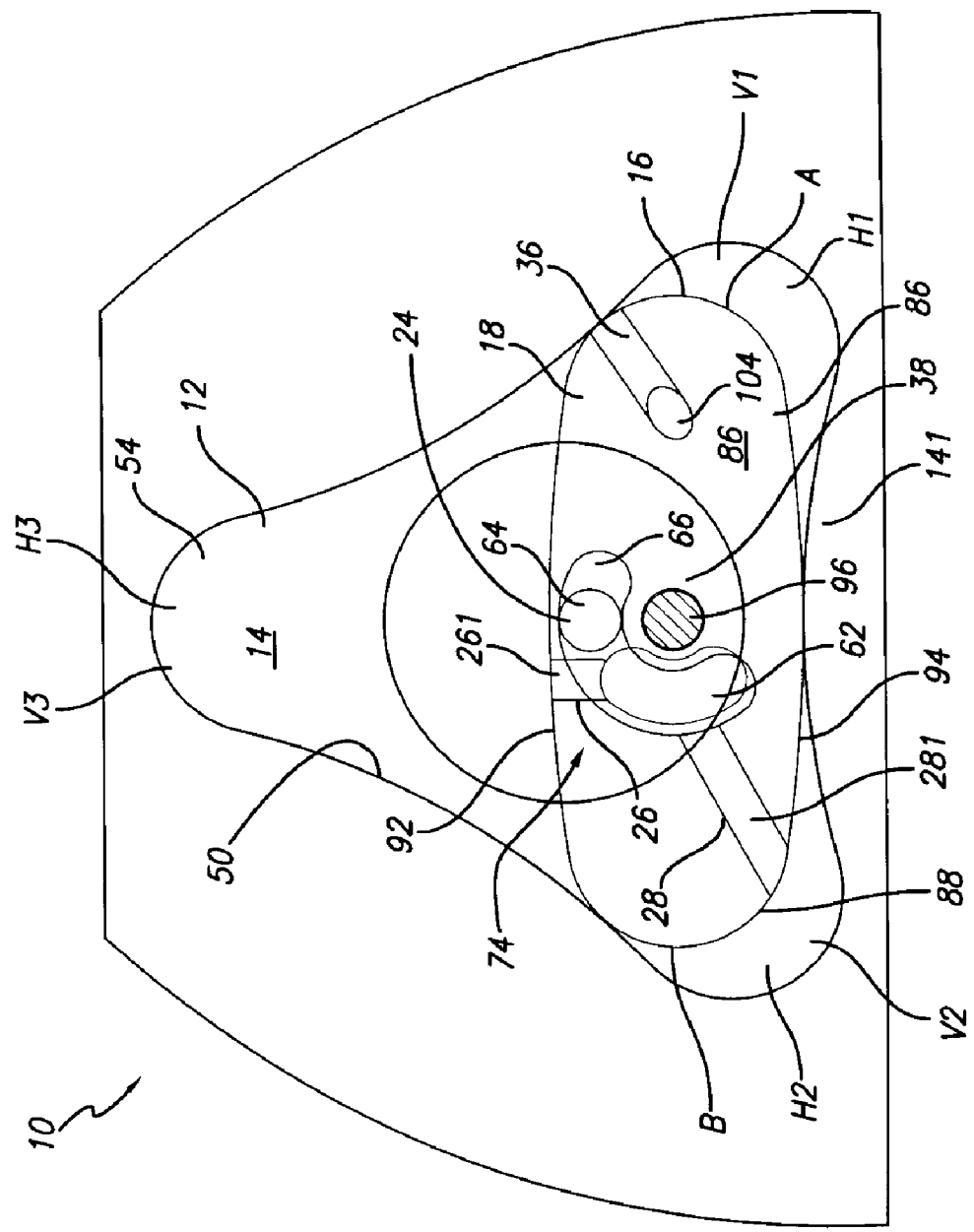
FIGS. 11-18 are schematic frame views of the chamber and rotor showing the progression of the rotor through its cycle as viewed from the chamber exhaust side, the rotor turning clockwise (CW), primarily with reference to the compression, combustion and exhaust aspects of the invention engine.

In FIG. 11, and following the viewpoint is of the exhaust side, not the intake side and so while the rotor 16 is in the same angle of rotation as in FIG. 10, the features are seen in their mirror image, and viewed from a plane inward of the exhaust chamber plate 48. This will be the case for all Figures from FIG. 11 through FIG. 18 in the rotation range from 360° to 720°. From this perspective, the crank plate 48 will be seen to turn CW and the rotor 16 will turn CCW. The intake crank plate 44 in these views is removed (is above the plane of the paper) to highlight solely the exhaust mechanism. The sparkplug 102 is in a plane behind the paper and residing behind the sparkplug channel 36. One of the magnetos 140 is timed to create a spark just as the channel 36 comes in front of the sparkplug 102, the spark meets the fuel mixture that is compressed behind the rotor in H1. In the next instant, the spark ignites the fuel mixture creating an explosion on the compressed fuel in chamber H1. The explosion propels the rotor Apex B upwards and turns the crankshaft CW.

Figure 12:
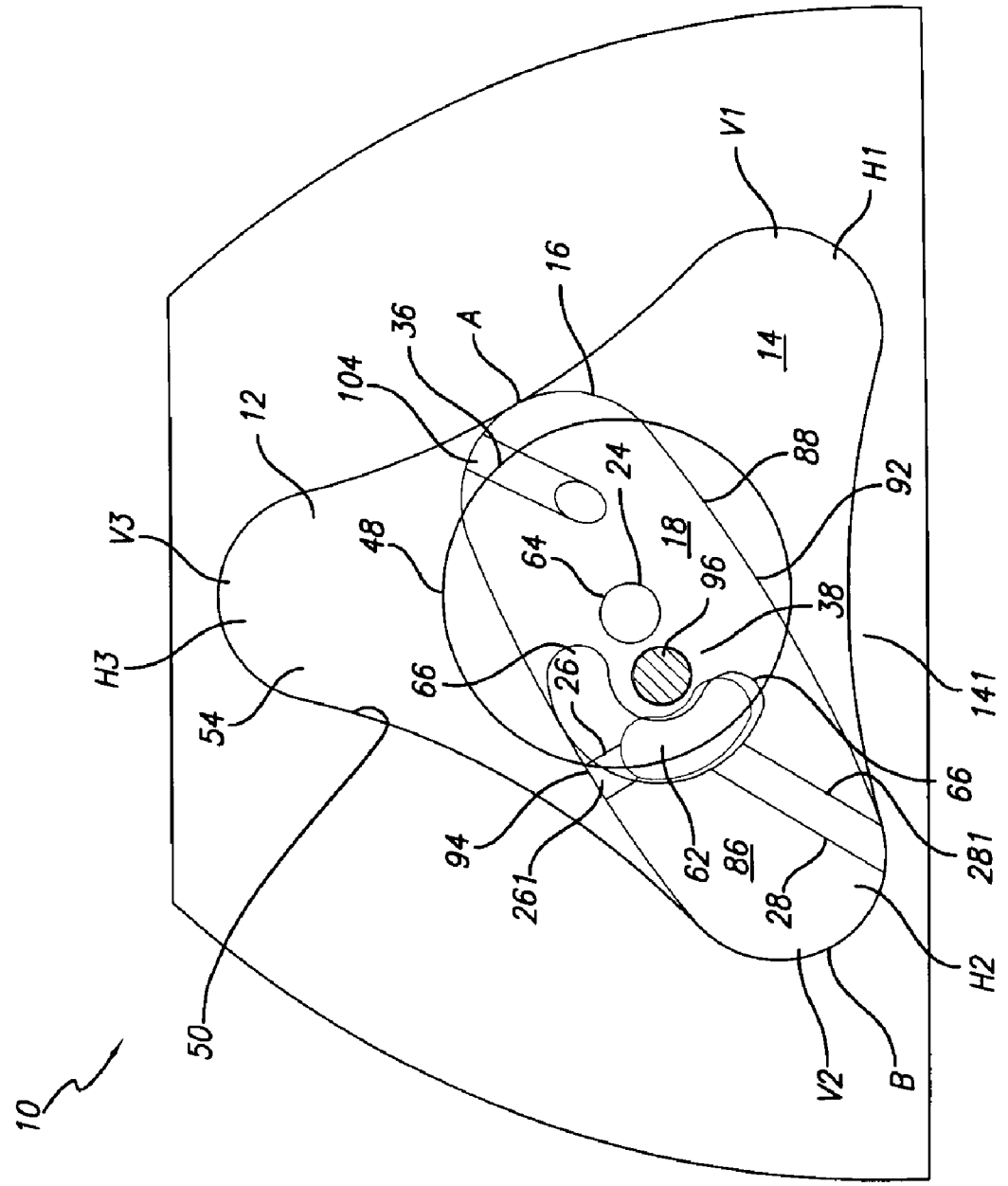

FIG. 12 shows the crankshaft advanced 60° CW to 420° by the power of the compressed fuel having been exploded in subchamber H1. The exhaust port 64 is not overlapped by the rotor exhaust recess 66 at this point, so its passage is closed to chamber H1. Thus chamber H1 remains sealed as it is midway through its expansion from the explosion.

Figure 13:
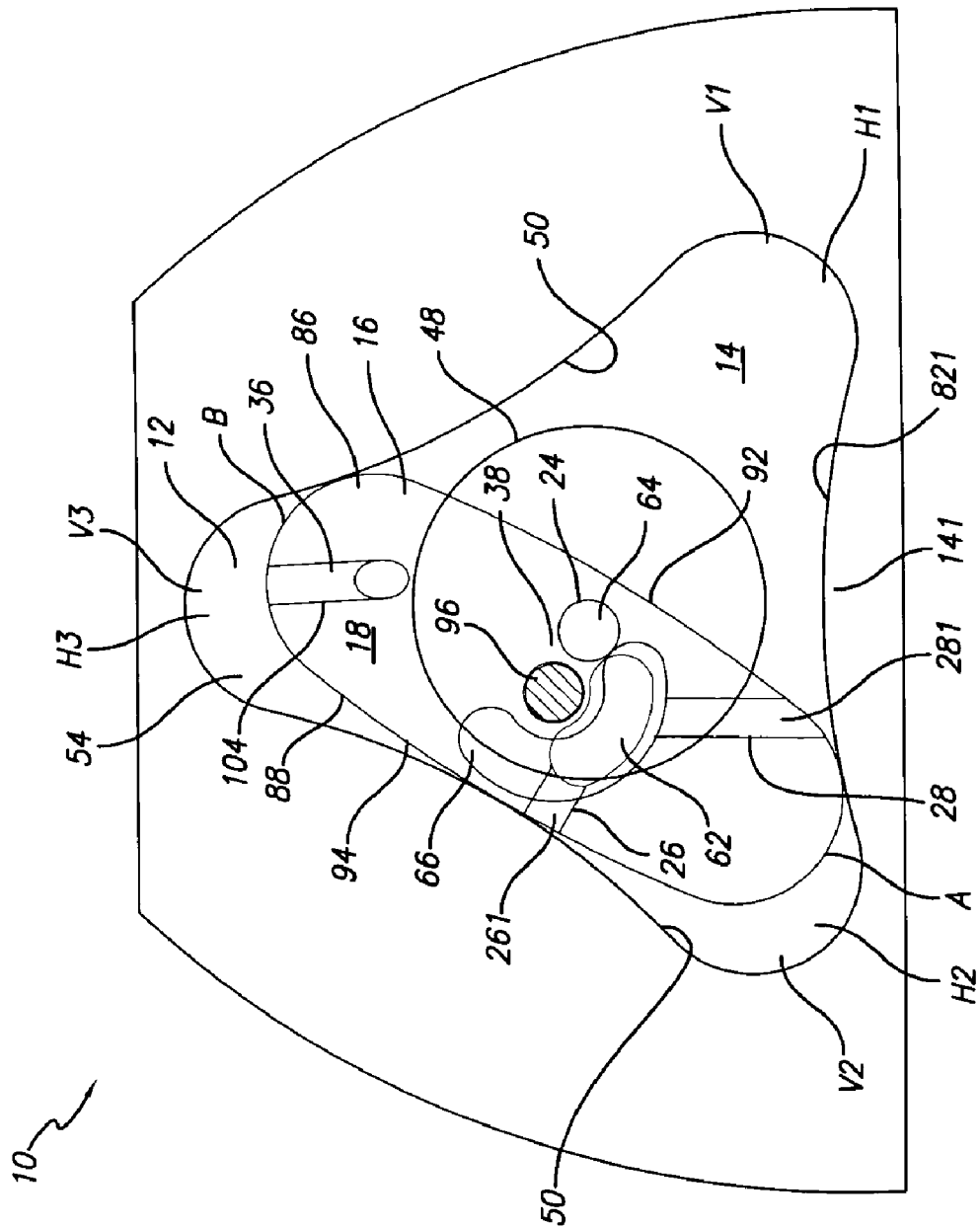

FIG. 13 shows the crank plate 48 advanced CW to 480° by the power of the compressed fuel having been exploded in H1. Chamber H1 is now at maximum volume for power. The exhaust port 64 is just ready to be overlapped by the rotor exhaust recess 66. In other words, just at this instant working chamber H1 opens to the exhaust port 64. Note that the rotor 16 and its ports 26, 28 and passage ways 261, 281 are now in the correct orientation to collapse and compress combusted gases to the exhaust port 64.

Figure 14:
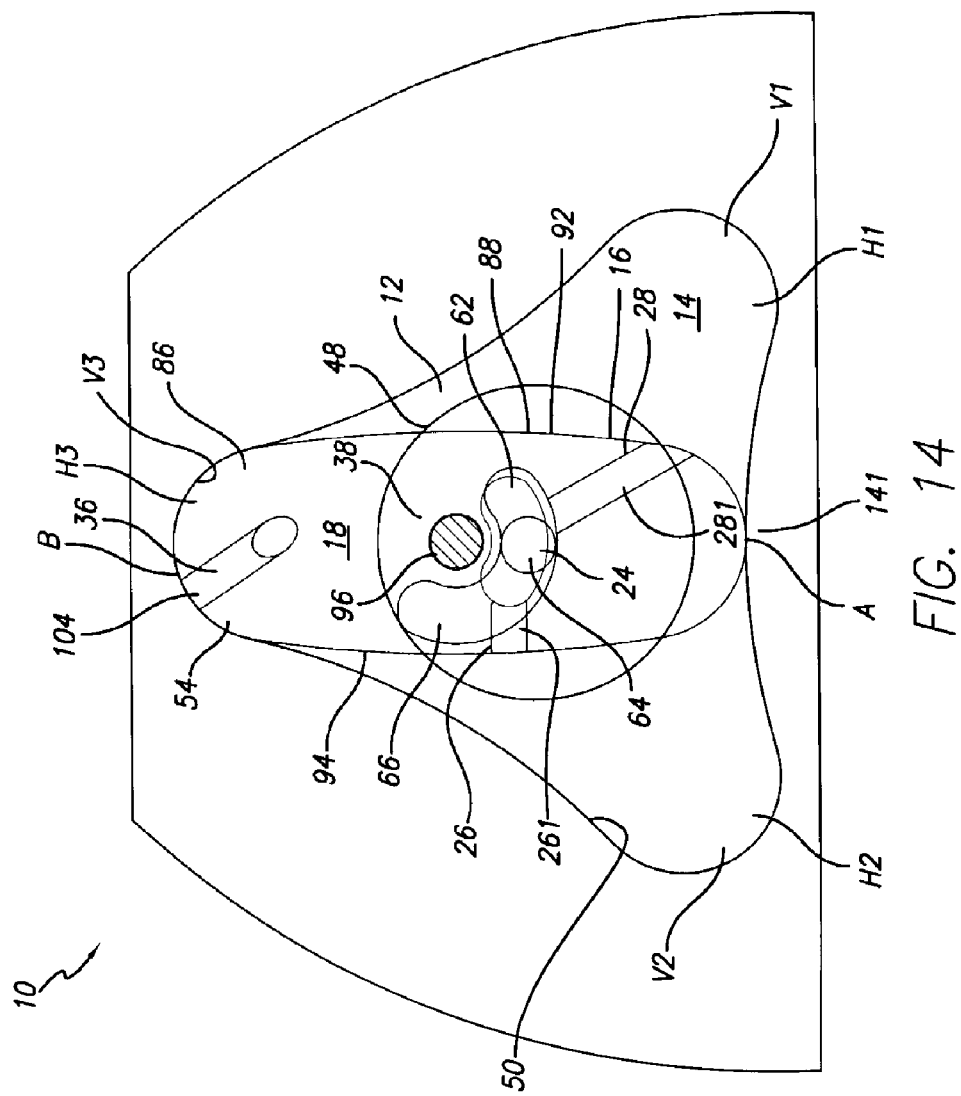

In FIG. 14, the axle has rotated CW to 540°, the lower apex (Apex A) of the rotor 16 is swinging to the right to collapse working chamber H1, and exhaust is midway through its phase. The rotor exhaust recess 66 fully overlaps the exhaust port 64, so the exhaust path 281 is open and combusted gases are being forced into the exhaust port.

Figure 15:
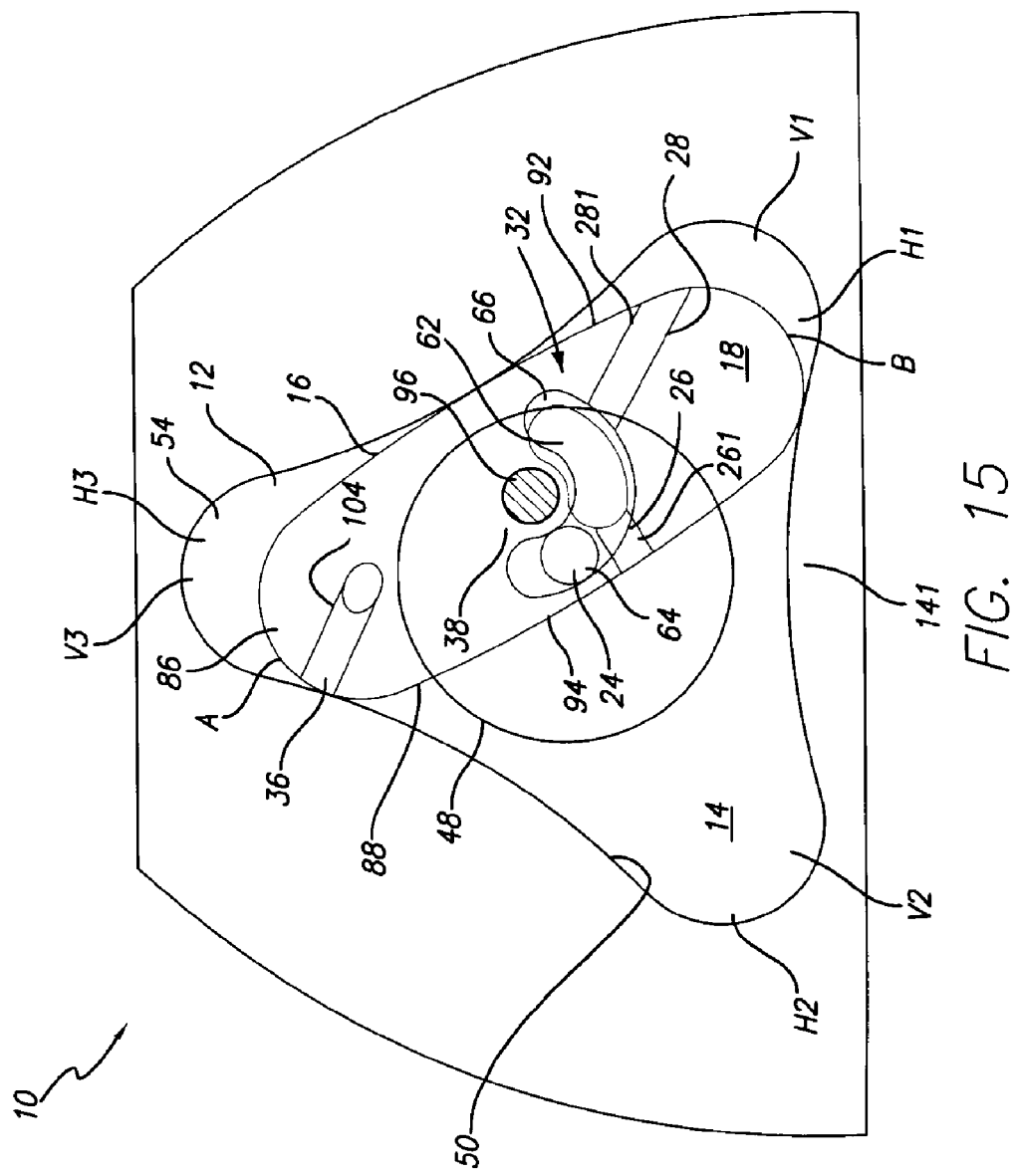

In FIG. 15, collapse of working chamber H1 continues until this phase is fully completed as shown here where the crank pin 96 rotation is now shown at 600°. The rotor exhaust recess 66 continues to overlap the exhaust port 64, and combusted gases continue to be expelled through the exhaust port.

Figure 16:
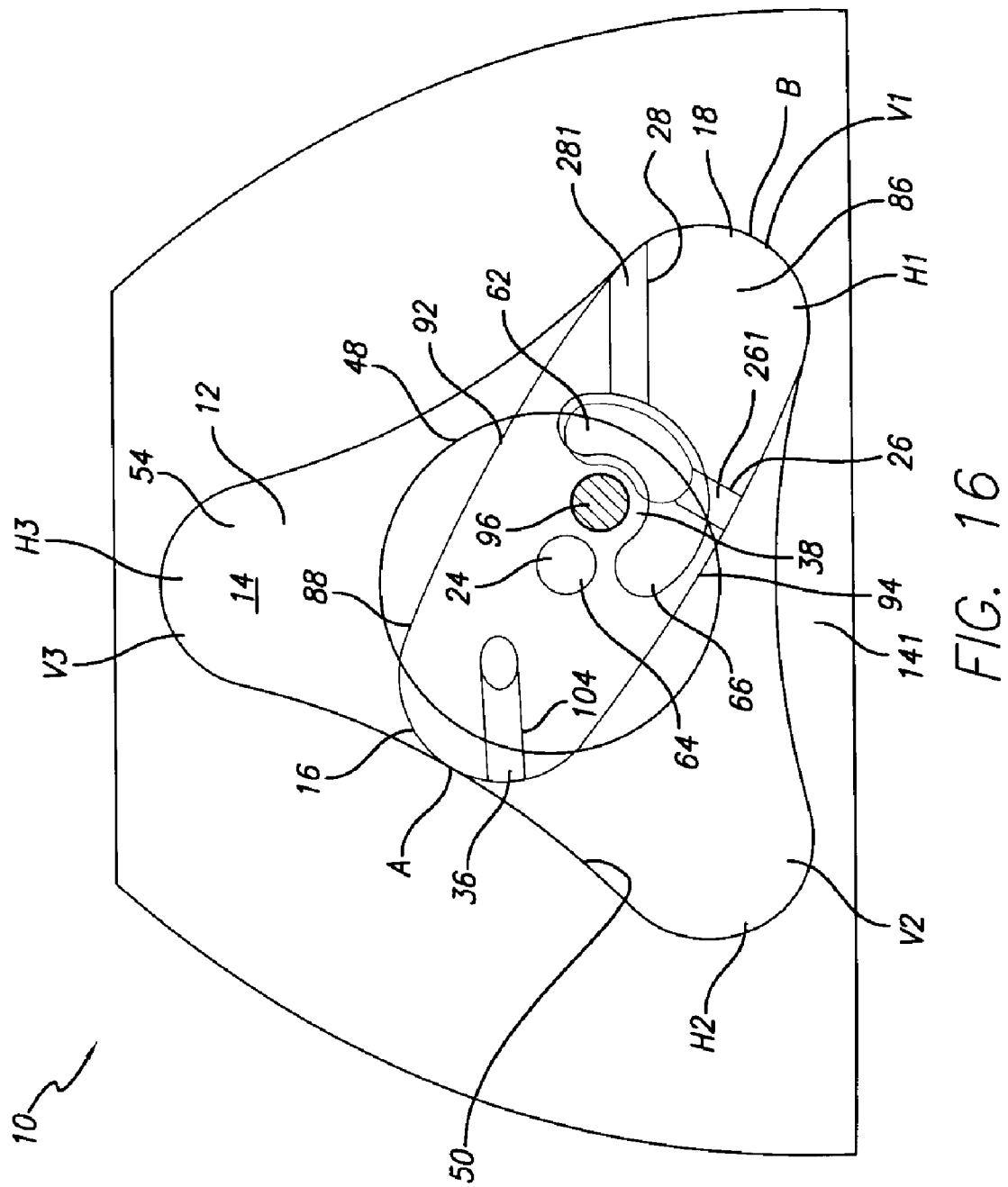

In FIG. 16, the rotor exhaust recess 66 no longer overlaps the exhaust port 64 at 640°. The crank plate 48 advanced to 660° still no longer overlaps the exhaust port 64. A slight amount of combusted gases from the working subchamber H1 have become compressed into the fuel lock 60 (located in a plane above the paper and thus not shown in this view) where the gases are slightly pressurized to above atmospheric pressure. The volume of chamber H1 is reduced to zero.

Figure 17:
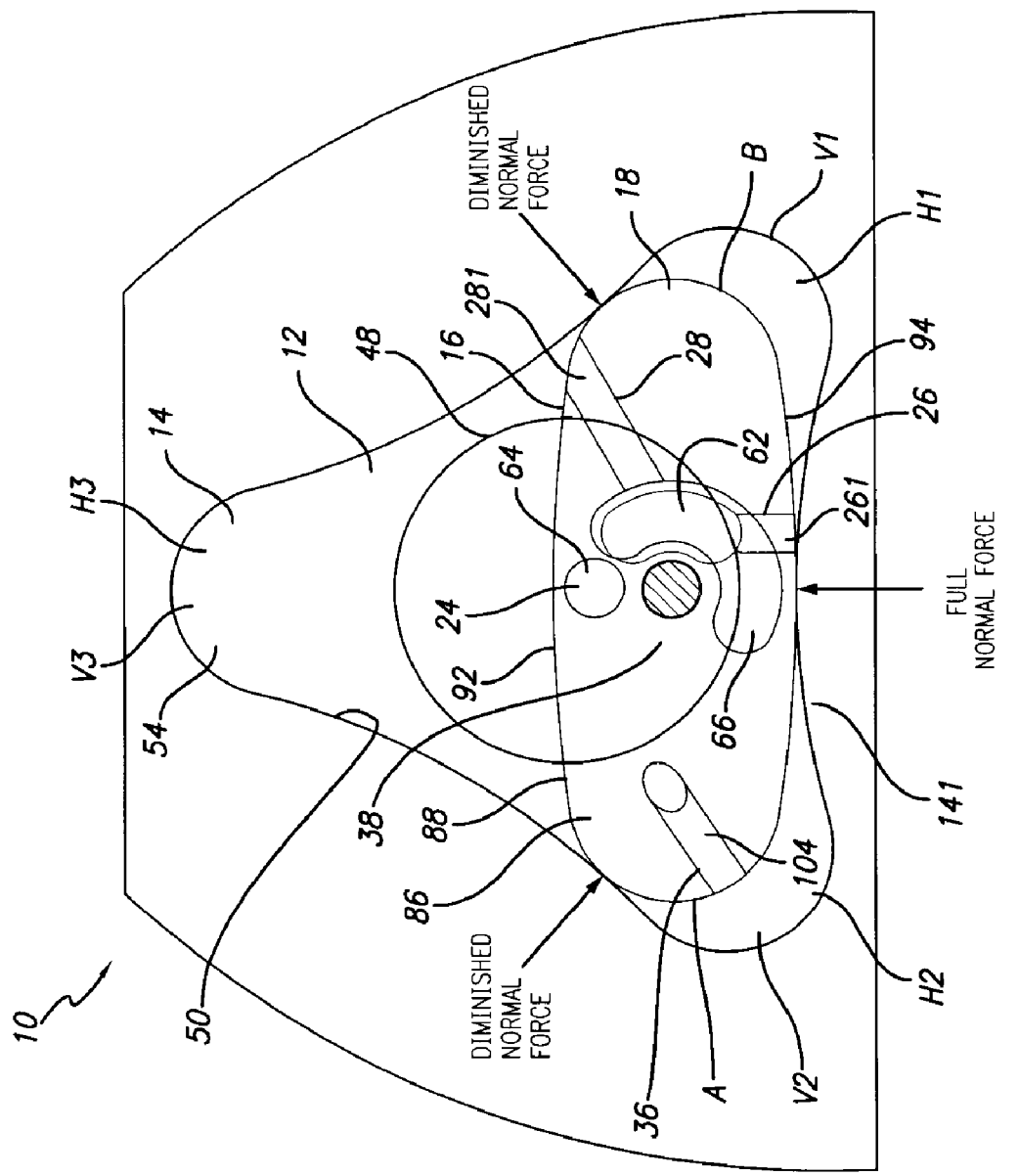
Figure 18:
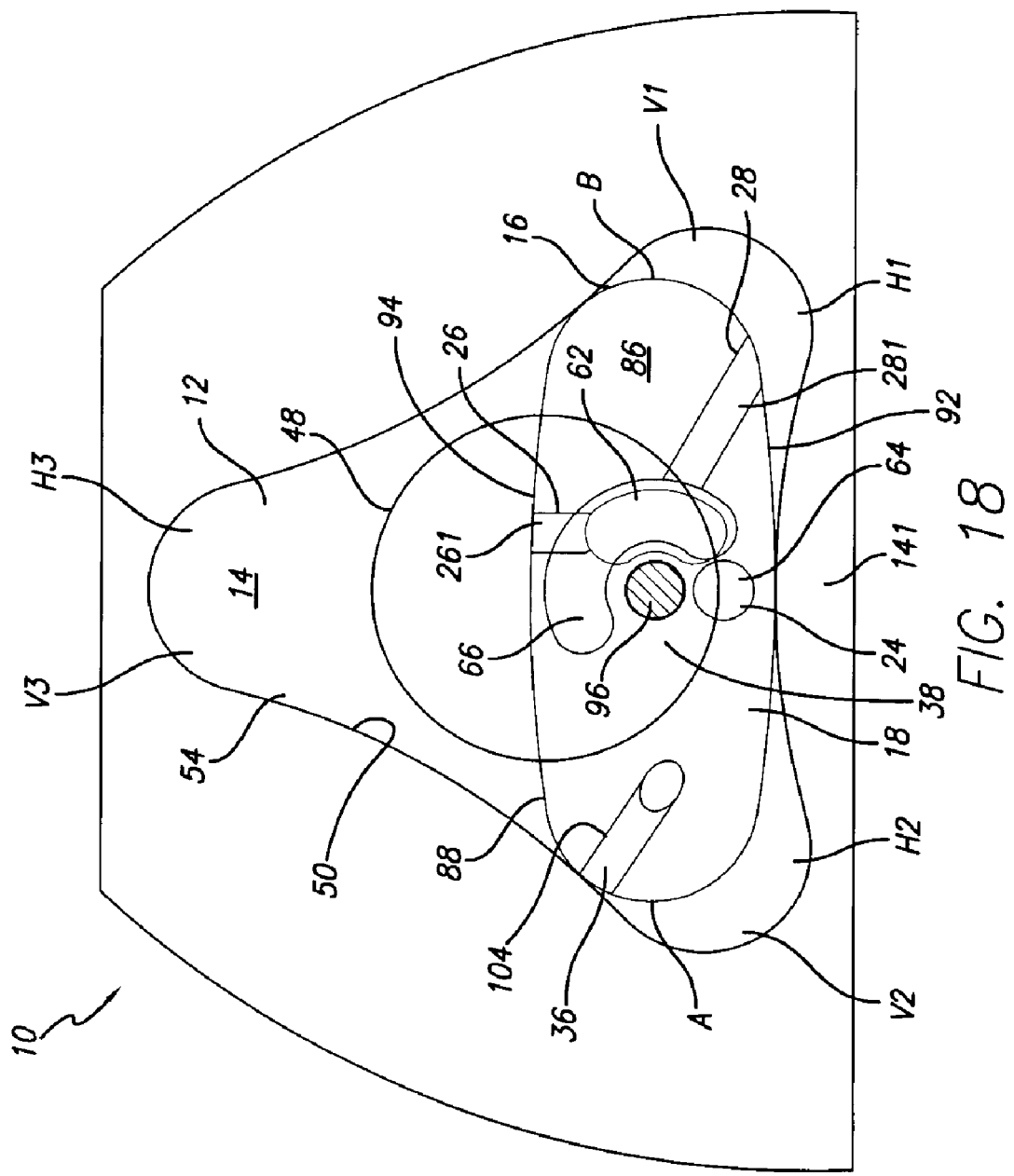

In FIGS. 17 and 18, we see that the crank plate 48 has completed two full revolutions as all the functions of the engine (intake, compression, transfer, power, exhaust, and transfer of the remaining combusted gases) have been completed; the engine is ready for the next cycle. A slight vacuum is pulled on the remaining gases in H1 so the next intake phase is started under the influence of a partial vacuum.

The Combined Functions of the Three Working Chambers

In the above discussion, we have stressed coverage of subchamber H1. Now turning to subchambers H2 and H3, as well as H1, the overall picture of what is happening in all three chambers sequentially, separately, successively, and simultaneously is best seen in Table 1:

Table 1. Sequential and Simultaneous Functions of Working Subchambers H1, H2 and H3

| Axle Rotation | Working Chamber H1 | Working Chamber H2 | Working Chamber H3 |
| --- | --- | --- | --- |
| 0° | Starting intake | Finished compression, starting transfer | Finished powering; starting exhaust |
| 60° | Mid intake | Fuel totally compressed into fuel lock | Mid exhaust |
| 120° | Finished intake, starting compression | Fuel is behind rotor; ignition and power phase started | Transferring un-combusted gases to fuel lock |
| 180° | Mid compression | Mid power | Un-combusted fuel pressed into fuel lock |
| 240° | Finished compression, starting transfer | Finished powering; starting exhaust | Starting intake |
| 300° | Fuel totally compressed into fuel lock | Mid exhaust | Mid intake |
| 360° | Fuel is behind rotor; ignition and power phase started | Transferring un-combusted gases to fuel lock | Finished intake, starting compression |
| 420° | Mid power | Un-combusted fuel pressed into fuel lock | Mid compression |
| 480° | Finished powering; starting exhaust | Starting intake | Finished compression, starting transfer |
| 540° | Mid exhaust | Mid intake | Fuel totally compressed into fuel lock |
| 600° | Transferring un-combusted gases to fuel lock | Finished intake, starting compression | Fuel is behind rotor; ignition and power phase started |
| 660° | Un-combusted fuel pressed into fuel lock | Mid compression | Mid power |

The Ignition System

The ignition system is comprised of a flywheel 138 with two magnets 140, side by side, rotating inside of three magnetos 132 distributed at 120 degrees. Each magneto 132 delivers a spark to each of the working chambers just as the rotor 16 comes into vicinity of 360°, 120° and 600° for subchambers H1, H2 and H3, respectively. Viewing the crank plate 48 rotation from the exhaust side it is realized that the crank plate and output shaft 56 must turn CCW from this viewpoint since all mechanical threads associated with the engine are right-hand-threads. The order of firing the spark from each magneto 132 from this view is H1, H2 and H3. This order can be rearranged to H2, H3 and H1 to conform to the fact that looking at the engine from the output shaft side means also looking at the intake side of the chamber. Notice that Table 1 was created from the sequence of FIG. 11 onward where the crank plate 48 is turning CCW and the rotor 16 turning CW. In Table 1 the true sequence of ignition in each working chamber is H2, H1 and H3 is set out allowing the stringing of the ignition cable (not shown) from magneto 132 at subchamber H2 to the spark plug in working subchamber H2. The cable must also be strung from magneto 132 at subchamber H3 to working subchamber H1. The cable from magneto 132 at subchamber H1 is strung to working chamber H3. Three magnetos of a single brand are selected, tailored to the same brand sparkplug and the same brand flywheel. Each magneto is a capacitive discharge ignition (CDI) type. While not wishing to be bound to a any particular theory of what is inside of each magneto, it is assumed that each magneto is constructed and works as follows: A U-shaped conductor has a short leg and a long leg. The legs are configured to have roundness to conform to the flywheel and to be placed on a magneto holder so that the legs are placed within the range of 0.010-inch of the flywheel. The U-shaped conductor acts as a low winding coil which surrounds a magnetic core which, in turn, has a high winding coil wrapped around the core. The flywheel magnets ride under the two legs of the horse shoe magnets.

In sequence:
1. The first external flywheel magnet with a magnetic north (N) pole passes under the short leg of the conductor. Passing a charge through the magnetic field imparts an electromotive force (Emf) and imposes a current in one direction around the magnetic core.
2. The second external flywheel magnet with a magnetic south (S) pole passes under the short leg of the magneto just as the first external flywheel magnet with a magnetic north (N) pole passes under the long leg of the magneto conductor, reversing the direction of Emf.
3. The second external flywheel magnet with a magnetic south (S) pole passes under the long leg of the magneto again reversing the Emf. Thus, an oscillating Emf is established in the U-shaped conductor.
4. The oscillating Emf is transmitted to a high winding coil through the magnetic core, establishing an oscillating charge in a capacitor.
5. The charge in the capacitor is released as current using a "buzzer-type" device through the cable to a spark plug. The sparkplug gap must be set so its resistance Ω associated with the current I produces a potential of about 30,000 volts between the sparkplug core and the ground electrode. Too wide a gap will create too much resistance and increase the voltage at spark which will tend to burn out the poles. Too narrow a gap will create a lower voltage at the spark, being less effective for imparting an explosion.

Compression Ratio

The compression ratio (CR) is based on the maximum volume at 120° of axle rotation plus the volume of the fuel lock to the minimum volume of compression (including the volume of the fuel lock). In all fuels a higher compression encourages detonation rather than deflagration, which is desired. Detonation is when a shock wave leads the explosion front; deflagration is when a thermal wave leads the explosion. Exploding the fuel close to TDC, where virtually all of the volume at explosion is just the volume of the fuel lock can drive the CR to approximately ⅔/₁, which is low enough to prevent uncontrollable detonation from just high pressure alone. When we retard the explosion point to approximately 330° axle rotation the CR goes down to approximately ⅚/₁, which should be optimum for this engine. The CR can be reduced further when the explosion occurs at 360° axle rotation. We want to drive the CR up to approximately 9/₁ or until inefficiencies come from leakage of the fuel mixture, until the chamber walls and rotor start burning or pitting, or to avoid nitrogen oxide emissions.

The Carburetor/Throttle System

Assume a maximum amount of fuel to each working subchamber to be 15 mg of gasoline. But this must be with the throttle fully open. When the throttle is only partially open, then the throttle acts in series with the carburetor to draw in only a fraction of 15 mg.

The speed of the output shaft is dependent upon the power of the explosion, and the power of the explosion is dependent upon both the fraction of the full amount of fuel being drawn in and how much it can be compressed. Leakage at the seals also has a bearing on the power of the engine.

Maximum power of the engine depends upon maximum rotational speed of the axle. At some rpm, the magnetos will start losing their effectiveness in creating sufficient spark to power the explosions.

Torque

Compare the herein disclosed engine with a 4-stroke single piston engine in terms of the angles of effective torque upon explosion. The piston engine requires that the crankshaft be advanced about 30° past TDC so power to the piston applies torque to the axle. So only about 150 degrees of piston downward translation are involved in powering. In the present engine, powering also utilizes 180°. Nearly the same advancement of 30° past TDC is required to achieve sufficient torque on the axle for explosion. However, the compression loss is less in our rotary design due to the shape of the rotor and chamber.

Sealing of the Rotor Curved Surface/Chamber Wall Curved Surface

The crank pin 96 applies a rather consistent normal (90°) force against the rotor 16, which in turn transmits this normal force against the chamber perimeter wall 50 imparting maximum sealing as shown in FIG. 17. The full normal force is diminished slightly as the rotor curved surfaces 92, 94 "roll" along the chamber wall 50 as shown.

HP Development

Without intending to be bound thereby, the following calculations are believed illustrative relative to the amount of heptane used per each cycle. Heptane is selected as the fuel for the following calculations. The stoichiometric reaction of heptane to oxygen is as follows:

$$C_7H_{16}+11O_2=7CO_2+8H_2O$$

Thus, one mole of heptane requires eleven moles of oxygen for full combustion. How much heptane is drawn in per each major cycle?

Heptane has a molecular weight of 100, so one gram of heptane contains 0.010 moles. For every gram of heptane, it will be necessary to provide 0.11 moles of oxygen. Since the molecular weight of oxygen is 32, 0.11 moles weighs 3.52 grams. Since air is approximately 20% oxygen, (3.52/0.20=) 17.6 grams of air is required per gram of heptane at stoichiometry. The density of air is approximately 0.00125 grams/cc. Therefore, 3.52 grams of oxygen requires [3.52/0.00125 grams/cc] 2816 cc of oxygen. The area displacement is 4.588 square inches. The thickness of the chamber is 1.000 inch. So the volume displacement is 4.588 cubic inches, or 74.9 cc per working chamber. But there are 3 working sub chambers. So the displacement for a major cycle is (3*74.9=) 224.7 cc.

If 224.7 cc of air/heptane will fill the 3 working chambers, how much of the mixture will be heptane at optimum stoichiometry? See Table 2:

TABLE 2

| material | MW | Moles | Weight, g | Density, Vol. g/cc | Volume of constituents (cc) for 1 gram of heptane | Volume of constituents (cc) for 1 major cycle | Estimate weight of constituents per major cycle, g |
|---|---|---|---|---|---|---|---|
| Heptane | 100 | 0.010 | 1.00 | 0.00125 | 800 cc | 12.0 | 0.015 |
| Oxygen | 32 | 0.110 | 3.52 | | 2,816 cc | | |
| Air | | | 17.60 | 0.00125 | 14,080 cc | 212.7 | 0.266 |
| Air/heptane | | | 18.60 | 0.00125 | 14,880 cc | 224.7 | 0.281 |

The ratio of the weight of heptane to air is 1.00 grams/17.6 grams air. As an approximation, use the density of air (0.00125 g/cc) for heptane and for the air/heptane mixture. Assuming one gram of heptane, there would be 800 cc of heptane, 14,080 cc of air and 14,880 cc of mixture. But a major cycle will involve 224.7 cc of mixture. Therefore, there will be 0.015 grams of heptane injected per major cycle. On the same basis of not wishing to be bound by theory a basis is offered for calculating horsepower of an engine according to the invention, based on fuel consumed. The horsepower of any engine is calculated from the formula:

$$HP = F * v$$

where
HP is the horsepower in foot-pounds/second
F is the force in pounds
v = velocity of the engine (rotation) in feet per second One must first determine how much energy is provided per major cycle. $0.015 \text{ g}/100 \text{ mw} = 1.5*10-4$ moles. N-heptane has full combustion energy of 1,150 Kcal/mole (or $1.15*10+6$ cal/mole). So, the combustion energy for each major cycle is $[(1.5*10-4 \text{ moles})*(1.15*10+6 \text{ cal/mole})=]$ 172.5 cal per each power revolution. However, two full axle revolutions are required to produce one power revolution. Therefore, (172.5 cal per each power revolution*2 revolutions/power revolution=) 86.3 cal per revolution. The operational speed is 3000 revolutions per minute (rpm) or 50 revolutions per second (rps). So there will be (86.3 calories/revolution*50 revolutions per second). Consequently, the engine will produce (86.3 calories/revolution)(50 revolutions/sec=) 4,315 calories/sec, or 258,900 cal/min. Since 1 HP is 10,694 cal/min, (258,900 cal/min)/(10,694 cal/min)=24.4 HP at 100% thermal efficiency.

These horsepower calculations assume 100% efficiently of combustion where fuel is fully combusted. More likely, the efficiency will be closer to 25%, comparable to a piston engine with electronic ignition. Therefore, the developed HP is approximately 24.2*0.25=6.0 HP.

Creating an Adequate Seal between the Crank Faces and the Rotor

Shaping and sizing of the of the rotor and chamber walls is required such that the flat face of the rotor turning counter to the flat face of the crank plates provides a sufficient seal against fuel leakage under pressure or vacuum. Of course, creating an adequate seal between the crank faces and the rotor is important to direct fuel to the proper working sub-chamber. Only when the rotor is of a certain minimum shape will the rotor have sufficient width not only to cover the intake crank plate intake port as it circles against the flat face of the rotor, but to ensure sufficient separation between the intake recess, the rotor sides and the rotor hub to permit sealing. As the shape of the rotor is increased, the separation between the rotor sides and the intake recess provides for a wider seal area better against fuel leakage during intake, compression, explosion and exhaust. The intake port diameter can also be increased for more facile intake. Increasing separation between rotor passages and rotor sides comes at a cost:

1) Of reducing the displacement and the power of the engine.
2) Of reducing the span from the geometric center of the triangle to the centroid of the rotor in its vertical orientation. (This is seen as the reduction of the diameter of circle in the basic geometry.) This is also the span between the center of the manifold or intake port and the crank in the axle face. Reducing this span places the recess in closer proximity to the crankshaft, thus introducing potential leakage of fuel through the mechanical clearance between the crankshaft and its mating hole.

However, higher roundness should generally favor the prospect for improved sealing against leakage of fuel.

Leakage occurring between the exhaust crank face/exhaust chamber plate and the flat face of the rotor can also be prevented by use of a spring to ensure contiguity between these surfaces. A Timken bearing can also be used to provide support against thrust of the explosion, which would otherwise push the face of the crank in the exhaust direction. This type of construction can help maintain a seal in much the same way that valve springs maintain the valves in a closed position against the forces of explosion in a piston engine. Notice that the rotor can provide support against the force of explosion on the other side due to internal spring-loading.

The cumulative relationship of roundness, rotor width and circle radius is shown in Table 3:

TABLE 3

| | PARENT SIDE | ROUNDNESS | ROTOR WIDTH | CIRCLE RADIUS |
|---|---|---|---|---|
| A | 5.8137 | 1.1756 | | .6927 |
| B | 5.8154 | 1.4000 | | .6208 |
| C | 5.8154 | 1.4000 | | .6208 |
| D | 5.8154 | 1.6000 | | .5571 |

The engine is seen in is full assembly along with external accessories in FIGS. 1 and 2. It is seen that only a few external parts are needed: a carburetor, throttle, three magnetos, flywheel, sparkplug leads and high tension cable (not shown) for the sparkplugs.

Engine Size

One version of the engine weighs approximately 6 pounds and should produce 6 HP based on calculations above. The calculation of this high power-to-weight ratio is based on the displacement of each working chamber, and its drawing in fuel and air at the optimum ratio. We have selected this size engine as a compromise between (1) the maximum size to minimize leaks between the rotor and chamber walls, which should be machined to a tolerance of 0.001 inch, and (2) maintaining a 0.001 inch mechanical clearance between the rotor and walls.

Any smaller engine will increase the gap to working volume ratio. Any larger design would require larger magnetos or battery powered ignition. However, the design should be fully scalable, given the adjustment in size to larger external parts. For example, a passenger car engine providing 120 HP should weigh approximately 120 pounds. The reduction in weight at any given horsepower output achieved by the invention rotary passenger car engine is itself a form of energy savings.

The simplest design has air-cooling using a fan built into the flywheel. The simplest means of lubrication is to use approximately 3% oil in gas mixture. The bearing surfaces can also use oil fed from external pressure pots (not shown).

I claim:

1. An internal combustion rotary engine having an engine chamber defined by a chamber wall and a rotor valve body in three locus-sealing contact with said chamber wall to define a series of three subchambers including a first subchamber for sequential compression, transfer, and combustion of a fuel mixture from a chamber fuel mixture intake and for exhausting combustion products through a chamber exhaust outlet; said rotor valve body defining a rotor first bodily internal path for fuel mixture travel from said chamber fuel mixture intake to said first subchamber for said compression and combustion to combustion products, and a rotor second bodily internal exhaust travel path between said combustion products in said first subchamber and said chamber exhaust outlet for exhausting of said combustion products, said chamber wall and said rotor valve body cooperating to transfer compressed fuel mixture past said rotor valve body within said first subchamber, said rotor valve body further defining a sealing and sliding valve structure with said chamber wall for controlling intake into and exhaust from said first subchamber; said rotor valve body centrally connected to intake side and exhaust side crank plates journaled in opposite side walls, said intake side and exhaust side crank plates coupled to drive an output shaft as the intake side and exhaust side crank plates rotate on their respective axes; said fuel mixture intake extending through said intake side crank plate to a fuel mixture intake port into said engine chamber, said rotor first bodily internal path including an arcuately extended intake recess registerable with said fuel mixture intake port to control said fuel mixture into said first subchamber, said chamber exhaust outlet extending from an exhaust port from said engine chamber through said exhaust side crank plate, said rotor second bodily internal path including an arcuately extended exhaust recess selectively registerable with said exhaust port to control said exhaust from said first subchamber.

2. The internal combustion rotary engine according to claim 1, in which said engine chamber has a spark generation structure, said rotor valve body defining a third bodily internal path between said spark generation structure and said first subchamber for effecting fuel mixture combustion.

3. The internal combustion rotary engine according to claim 1, in which said rotor valve body advances to sweep said first subchamber, said first subchamber defining a compressed fuel mixture lock beyond the sweep of said rotor valve body for transferring said fuel mixture past said rotor valve body after compression by the advance of said rotor valve body and before combustion in the wake of said rotor valve body.

4. The internal combustion rotary engine according to claim 3, in which said series of three subchambers further includes second and third subchambers having the same structure and cycle of functions as said first subchamber, each of said three subchambers having a respective chamber vertex and arranged to have their respective cycles offset in time.

5. The internal combustion rotary engine according to claim 1, in which said output shaft is at a central elevation of said engine chamber.

6. An internal combustion rotary engine comprising an assembly of a chamber and a rotor, said rotor having a rotor body with a rotor central hub, said rotor body defining within said chamber three subchambers each at least partly defined by opposed intake and exhaust crank plates connected to said rotor central hub and each providing successively in time offset relation sequential compression, transfer, combustion and exhaust functions; a spark generation structure, a fuel mixture supply, and an output shaft coupled to and rotating with said intake and exhaust side crank plates, said intake side crank plate defining a fuel mixture path from said fuel mixture supply to a rotor body intake structure, said exhaust side crank plate defining an exhaust port and exhaust outlet from said three subchambers to a region beyond said chamber, said rotor body having said rotor body intake structure selectively and in sequence communicating with said fuel mixture path in said intake side crank plate so that said fuel mixture supply is supplied to each of said three subchambers for compression, transferring past said rotor body and combustion, and communicating through said rotor body by said spark generation structure with compressed fuel mixture for combustion thereof, rotor body exhaust structure selectively communicating through said rotor body combustion by products to said exhaust port in the exhaust side crank plate for exhaust to a region beyond said chamber, all in timed relation to drive said output shaft with said rotor body via said rotor body and said output shaft connected to said intake and exhaust crank plates.

7. The internal combustion rotary engine according to claim 6, in which said chamber and said rotor body are relatively shaped for rotor rotation in continuous and dynamic three locus sealing contact of said chamber and said rotor body to define said three subchambers, said three subchambers being simultaneously responsive to said rotor rotation to have progressively varying expanding and contracting volumes for respective compression, transfer, combustion and exhaust functions.

8. The internal combustion rotary engine according to claim 6, in which said chamber has intake and exhaust sidewalls, a depth defined by a generally triangular, curvilinear perimeter wall spacing said chamber intake and exhaust sidewalls and defining three equally spaced, relatively angularly disposed, symmetrical, inwardly convex chamber surfaces joined by three vertices, said rotor body has oppositely facing rotor sidewalls, a curvilinear outwardly peripheral wall providing two oppositely facing outwardly convex major rotor surfaces and two apexes spaced by said rotor sidewalls and joining said major rotor surfaces cooperatively shaped to have continuous and dynamic three locus sealing contact of said chamber wall and said rotor body.

9. The internal combustion rotary engine according to claim 6, in which said chamber includes a chamber intake side wall for fuel mixture intake to said chamber from said fuel mixture supply, said chamber intake sidewall journaling said intake side crank plate, said intake side crank plate being connected to said rotor central hub by an intake side crank pin, a chamber intake exhaust sidewall journaling said exhaust side crank plate, said exhaust side crank plate being connected to said rotor central hub by an exhaust side crank pin.

10. The internal combustion rotary engine according to claim 6, in which said spark generation structure includes a spark plug carried by said chamber, and a spark communicating structure through said rotor body selectively communicating said spark plug with compressed fuel mixture in a respective one of said three subchambers responsive to rotor body rotation within said chamber.

11. The internal combustion rotary engine according to claim 6, in which said chamber has an exhaust sidewall journaling said exhaust crank plate, an intake sidewall journaling said intake side crank plate, said intake and exhaust crank plates being crank pin-coupled to said rotor central hub, said intake side crank plate having a fuel intake port in communication with said fuel mixture supply and open to said chamber, said rotor body having an intake side rotor body sidewall selectively sealably engaging said intake side crank plate at said fuel intake port in timed relation with rotor rotation to limit fuel intake to said chamber.

12. The internal combustion rotary engine according to claim 11, in which said intake side crank plate has said fuel intake port in communication with said fuel mixture supply and open to said chamber, said intake side rotor body sidewall controlling fuel mixture intake from said fuel intake port in timed relation with said rotor body rotation to limit fuel mixture intake to said three subchambers.

13. The internal combustion rotary engine according to claim 6, in which said rotor body has an exhaust side rotor body sidewall and an intake side rotor body sidewall, said chamber has an exhaust sidewall opposing said exhaust side rotor body sidewall, said exhaust side crank plate is journaled by said chamber exhaust sidewall, said exhaust side crank being crank pin-coupled to said rotor central hub, and including also said chamber having an chamber intake sidewall opposing said intake side rotor body sidewall, said intake side crank plate opposite said exhaust side crank plate and journaled by said chamber intake sidewall, said exhaust side rotor body sidewall controlling exhaust from said three subchambers to said region beyond said chamber in timed relation with said rotor body rotation to limit exhaust from said three subchambers.

14. The internal combustion rotary engine according to claim 6, in which said chamber journals said intake side crank plate having a fuel mixture intake port in communication with said fuel mixture supply and open to said chamber, said rotor body has an intake side rotor sidewall sealably engaging said intake side crank plate at said fuel intake port, and in which said rotor body intake structure comprises an intake recess in said intake side rotor body sidewall larger than and arranged to register with said fuel mixture intake port and a rotor body intake passage from said intake recess through said rotor body to said three subchambers for fuel mixture compression in timed relation with said rotor body rotation to limit fuel intake to said three subchambers for compression.

15. The internal combustion rotary engine according to claim 14, in which said intake recess is arcuately extended for extended registration with said fuel mixture intake port during said rotor body rotation.

16. The internal combustion rotary engine according to claim 6, in which said exhaust side crank plate is journaled by said chamber said rotor body has an exhaust side rotor sidewall sealably engaging said exhaust side crank plate at said exhaust port, said rotor body being engaged by a rotor crank pin, and in which said rotor exhaust structure comprises an exhaust recess in said exhaust side rotor sidewall larger than and arranged to register with said exhaust port for exhausting in timed relation with said rotor body rotation to have combustion products exhaust from one of said three subchambers and limited to combustion products in a respective one of said three subchambers.

17. The internal combustion rotary engine according to claim 16, in which said exhaust recess is arcuately extended for extended registration with said exhaust port during said rotor body rotation.

18. An internal combustion rotary engine comprising an assembly of a chamber and rotor, said rotor having a rotor body with a central rotor hub, said chamber and said rotor body being relatively shaped for rotor rotation in continuous and dynamic three locus sealing contact of said chamber and said rotor body to define three subchambers that are simultaneously responsive to said rotor rotation to have progressively varying expanding and contracting volumes for respective compression, transfer, combustion and exhaust functions, each one of said three subchambers being at least partly defined by opposed intake and exhaust crank plates connected to said central rotor hub by respective crank plate crank-pins, a spark generation structure, a fuel mixture supply, and an output shaft coupled to and rotating with said intake and exhaust crank plates, said intake side crank plate having a fuel mixture intake port in communication with said fuel mixture supply and open to said chamber, said rotor body having rotor intake structure selectively and in sequence communicating through said rotor body said fuel mixture supply from said fuel mixture intake port in said intake side crank plate to said three subchambers for compression, transferring past said rotor body, and combustion, and communicating through said rotor body said three subchambers with said spark generation structure for fuel mixture combustion, said rotor having rotor exhaust structure selectively communicating through said rotor body said combustion products from said three subchambers to an exhaust port in said exhaust side crank plate for exhaust to a region beyond said chamber, all in timed relation to drive said output shaft with said rotor body via said rotor body and said output shaft connected to said intake and exhaust crank plates.

19. The internal combustion rotary engine according to claim 18, in which said chamber has intake and exhaust sidewalls, a depth defined by a generally triangular, curvilinear perimeter wall spacing said chamber intake and exhaust sidewalls and defining three equally spaced, relatively angularly disposed, symmetrical, inwardly convex chamber surfaces joined by three vertices, said rotor body has oppositely facing rotor sidewalls, a curvilinear outwardly peripheral wall providing two oppositely facing outwardly convex major rotor surfaces and two apexes spaced by said rotor sidewalls and joining said major rotor surfaces cooperatively shaped to have continuous and dynamic three locus sealing contact of said chamber wall and said rotor body.

20. The internal combustion rotary engine according to claim 19, in which said exhaust side crank plate is journaled in said chamber exhaust sidewall.

21. The internal combustion rotary engine according to claim 20, in which said spark generation structure includes a spark plug carried by said chamber sidewall, and a spark communicating structure through said rotor body selectively communicating said spark plug with compressed fuel mixture in said three subchambers responsive to said rotor body rotation within said chamber.

22. The internal combustion rotary engine according to claim 21, in which said rotor sidewalls selectively sealably engaging said intake side crank plate at said fuel mixture intake port in timed relation with said rotor rotation to limit fuel intake to said three subchambers.

23. The internal combustion rotary engine according to claim 22, in which said exhaust side crank plate exhaust port is in communication with a region beyond said chamber and open to said chamber, said rotor sidewalls includes a rotor exhaust sidewall controlling exhaust from said three subchambers to said region beyond said chamber in timed relation with said rotor body rotation to limit exhaust from said three subchambers to products of fuel mixture combustion.

24. The internal combustion rotary engine according to claim 23, in which said rotor sidewalls including an intake side rotor sidewall that controls fuel mixture intake from said fuel mixture intake port in timed relation with said rotor body rotation to limit fuel mixture intake to said three subchambers.

25. The internal combustion rotary engine according to claim 24, in which said rotor body intake structure further comprises an intake recess in said intake rotor sidewall larger than and arranged to register with said fuel mixture intake port and a rotor body intake passage from said intake recess through said rotor body to said three subchambers for fuel mixture compression in timed relation with said rotor body rotation to limit fuel intake to said three subchambers.

26. The internal combustion rotary engine according to claim 25, in which said intake recess is arcuately extended over for extended registration with said fuel mixture intake port during said rotor body rotation.

27. The internal combustion rotary engine according to claim 26, in which said rotor body exhaust structure further comprises an exhaust recess in said rotor exhaust sidewall larger than and arranged to register with said exhaust port and a rotor body exhaust passage from said exhaust recess through said rotor body from said three subchambers for exhaust in timed relation with said rotor body rotation to have combustion products exhaust from said three subchambers.

28. The internal combustion rotary engine according to claim 27, in which said exhaust recess is arcuately extended for extended registration with said exhaust port during said rotor body rotation.

29. An internal combustion rotary engine comprising a chamber having a triangular and curvilinear perimeter wall, a chamber intake sidewall and an opposed chamber exhaust sidewall spaced apart by said perimeter wall, a rotor having a rotor body that rotates about a center rotor hub within said chamber, said rotor body having a curvilinear rotor peripheral wall, a rotor body intake sidewall and a rotor body exhaust sidewall oppositely facing and spaced apart by said rotor peripheral wall, said rotor peripheral wall opposing and sealingly engaging said chamber perimeter wall, a fuel mixture supply to said chamber, a spark generation structure adjacent said chamber and selectively blocked from access to said chamber by said rotor, an output shaft extending beyond said chamber, said chamber and said rotor body being relatively shaped for said rotor rotation and continuous and dynamic three locus sealing contact of said chamber perimeter wall and said rotor peripheral wall to define simultaneously responsive to said rotor rotation three subchambers with progressively varying expanding and contracting volumes and progressively differing functions including sequential fuel mixture compression, transfer, fuel mixture combustion, and fuel mixture combustion product exhaust, a compressed fuel mixture lock arranged for said transfer, an intake side crank plate connected to said center rotor hub, said intake side wall journaling said intake side crank plate, an exhaust side crank plate, said exhaust and intake side crank plates each being connected to said center rotor hub for rotating said rotor oppositely to the rotation of said intake and exhaust side crank plates, said exhaust sidewall journaling said exhaust side crank plate, said intake and exhaust side crank plates being coupled axially to said output shaft and rotating with said output shaft, a fuel mixture path from said fuel mixture supply through said intake side crank plate and through said rotor body to said compression in the corresponding one of said three subchambers including a relatively nonextended intake port in said intake side crank plate and a cooperating relatively extended, arcuate intake recess and intake passage in said rotor body arranged to selectively communicate said fuel mixture supply with said three subchambers when said intake port and said intake recess and intake passage are mutually registered and said three subchambers are undergoing expansion to draw said fuel mixture into said three subchambers, and otherwise block communication of said fuel mixture supply with the corresponding one of said three subchambers said rotor body intake side wall, a combustion product exhaust path from the corresponding one of said three subchambers through said rotor body and said exhaust side crank plate to beyond said chamber including an exhaust port in said exhaust side crank plate and a cooperating relatively extended, arcuate exhaust recess and exhaust passage in said rotor body arranged to selectively communicate the corresponding one of said three subchambers with a region beyond said chamber via said exhaust port in said exhaust side crank plate, and a spark channel through said rotor for selectively opening the corresponding one of said three subchambers to said spark generation structure for compressed and transferred fuel mixture ignition in timed relation with compression and exhaust of said fuel mixture, whereby said rotation of said rotor drives said output shaft angularly oppositely on the axis of said intake and exhaust side crank plates via intake and exhaust side crank pins.

30. A method of operating an internal combustion rotary engine having three volume variable subchambers progressively defined by a rotor rotating in a chamber and opposed crank plate faces where intake and exhaust crank plates are journaled in said chamber, said intake and exhaust crank plates being drivingly connected to said rotor, including successively in each one of said three subchambers in time-offset relation passing a fuel mixture from a supply through a rotating said intake crank plate to the respective one of said crank plate faces, intaking said fuel mixture into said rotor and thence into the corresponding one of said three subchambers from said respective one of said crank plate faces, compressing said fuel mixture in said respective one of said three subchambers, transferring the compressed fuel mixture past said rotor into a fuel lock open in each one of said three subchambers during fuel mixture compression, returning said compressed fuel mixture to said respective one of said three subchambers, igniting said compressed and transferred fuel mixture with a spark communicated to said respective one of said three subchambers through said rotor to drive said rotor and said intake and exhaust crank plates angularly, passing said fuel mixture combustion products through said rotor from said respective one of said three subchambers and thence through a rotating said exhaust crank plate via a respective one of said crank plate faces to a region beyond said chamber, and driving an output shaft with said intake and exhaust crank plates.

* * * * *

UNITED STATES PATENT AND TRADEMARK OFFICE
CERTIFICATE OF CORRECTION

| | | |
|---|---|---|
| PATENT NO. | : 8,037,862 B1 | Page 1 of 1 |
| APPLICATION NO. | : 12/129676 | |
| DATED | : October 18, 2011 | |
| INVENTOR(S) | : Richard L. Jacobs | |

It is certified that error appears in the above-identified patent and that said Letters Patent is hereby corrected as shown below:

In the claims:
Claim 29, Col. 26, Line 20, after "subchambers" please insert --by--

Signed and Sealed this
Thirteenth Day of December, 2011

David J. Kappos
*Director of the United States Patent and Trademark Office*